(12) United States Patent
Hempe et al.

(10) Patent No.: US 7,064,462 B2
(45) Date of Patent: Jun. 20, 2006

(54) POWER TOOLS WITH SWITCHED RELUCTANCE MOTOR

(75) Inventors: David A. Hempe, Wauwatosa, WI (US); Gary D. Meyer, Waukesha, WI (US); Roderick N. Ebben, Dousman, WI (US); Jeffrey M. Brozek, Whitefish Bay, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 67 days.

(21) Appl. No.: 10/357,729

(22) Filed: Feb. 4, 2003

(65) Prior Publication Data

US 2003/0163924 A1 Sep. 4, 2003

Related U.S. Application Data

(60) Provisional application No. 60/354,253, filed on Feb. 4, 2002.

(51) Int. Cl.
- *H02K 3/52* (2006.01)
- *H02K 5/15* (2006.01)
- *B27B 5/29* (2006.01)
- *B23D 45/16* (2006.01)
- *B25F 5/00* (2006.01)

(52) U.S. Cl. ............ 310/50; 310/168; 310/68 D; 310/71; 173/217; 30/388

(58) Field of Classification Search ........... 310/166, 310/168, 68 D, 50, 71, 90; 30/388, 392; 173/217, 117; 83/478

See application file for complete search history.

(56) References Cited

U.S. PATENT DOCUMENTS 3,678,352 A 7/1972 Bedford ............... 318/138

(Continued)

FOREIGN PATENT DOCUMENTS

DE 19527981 2/1997

(Continued)

OTHER PUBLICATIONS

Reciprocating saw manufactured by Milwaukee Electric Tool Corporation that includes a magnet hub, the magnet hub being offered for sale as early as Apr. 2000 (see attached statement of relevance and FIGS. 1-3).

*Primary Examiner*—Karl Tamai
(74) *Attorney, Agent, or Firm*—Michael Best & Friedrich LLP

(57) ABSTRACT

A method of assembling a power tool, a power tool, a method of assembling an electrical device, and an electrical device includes a switched reluctance motor. The electrical device is preferably a hand-held power tool, however, any type of electrical device that includes a switched reluctance motor may benefit from any number of aspects of the invention. In one independent aspect, the invention provides a construction that reduces tolerance stack-up. In another independent aspect, the invention provides a self-contained electronics package that plugs into a switched reluctance motor to provide control operation of the switched reluctance motor. In another independent aspect, the invention provides enhanced cooling that increases the efficiency of the electrical device using a switched reluctance motor. In another independent aspect, the invention provides an encapsulated magnet that allows for contaminant free motor control over the life of the SR motor. In another independent aspect, the invention provides an apparatus and a method for aligning magnets of a magnet hub with respect to the rotor poles the magnet poles represent.

30 Claims, 38 Drawing Sheets

U.S. PATENT DOCUMENTS

| | | | |
|---|---|---|---|
| 4,133,230 A | 1/1979 | Inaba et al. ................. 82/28 R |
| 5,009,554 A | 4/1991 | Kameyama et al. ......... 409/239 |
| 5,042,348 A | 8/1991 | Brundage et al. .......... 83/471.3 |
| 5,119,466 A * | 6/1992 | Suzuki ....................... 388/831 |
| 5,517,746 A * | 5/1996 | Cox et al. .................... 29/560 |
| 5,562,135 A | 10/1996 | Beth et al. ................... 144/1.1 |
| 5,625,239 A | 4/1997 | Persson et al. ........... 310/68 B |
| 5,724,875 A | 3/1998 | Meredith et al. ............. 83/397 |
| 5,765,273 A | 6/1998 | Mora et al. ................... 29/550 |
| 5,771,949 A | 6/1998 | Welsh et al. ................ 144/130 |
| 5,864,477 A * | 1/1999 | Webster ...................... 363/132 |
| 5,936,373 A * | 8/1999 | Li et al. ...................... 318/701 |
| 5,957,021 A | 9/1999 | Meredith et al. ............. 83/397 |
| 5,960,531 A | 10/1999 | Mora et al. ................... 29/560 |
| 5,967,205 A | 10/1999 | Welsh et al. ............. 144/117.1 |
| 6,011,331 A | 1/2000 | Gierer et al. ................ 310/58 |
| 6,076,573 A | 6/2000 | Welsh et al. ............. 144/117.1 |
| 6,123,158 A | 9/2000 | Steffen ....................... 173/217 |
| 6,193,473 B1 | 2/2001 | Mruk et al. ................. 417/350 |
| 6,262,510 B1 * | 7/2001 | Lungu ........................ 310/254 |
| 6,276,038 B1 | 8/2001 | Boochakorn et al. ...... 29/281.5 |
| 6,320,286 B1 | 11/2001 | Ramarathnam ............. 310/50 |
| 6,538,403 B1 * | 3/2003 | Gorti et al. ................. 318/254 |
| 6,570,284 B1 * | 5/2003 | Agnes et al. ................. 310/89 |
| 2001/0032534 A1 | 10/2001 | Ceroll et al. .................. 83/473 |
| 2001/0033742 A1 | 10/2001 | Weaver et al. ............. 388/800 |
| 2001/0042630 A1 * | 11/2001 | Kristen et al. ................. 173/1 |
| 2001/0043806 A1 | 11/2001 | Gorti et al. ................. 388/800 |
| 2001/0052416 A1 | 12/2001 | Wissmach et al. ............. 173/4 |
| 2002/0047414 A1 | 4/2002 | Latimer ...................... 310/112 |
| 2003/0163924 A1 * | 9/2003 | Hempe et al. ................ 30/388 |

FOREIGN PATENT DOCUMENTS

| | | |
|---|---|---|
| DE | 19816684 | 12/1999 |
| EP | 0709155 | 5/1996 |
| EP | 0934789 A2 | 8/1999 |
| GB | 2295730 | 6/1996 |
| GB | 2319908 | 6/1998 |
| GB | 2362120 | 11/2001 |
| WO | WO 00/74204 A2 | 12/2000 |
| WO | WO 00/074204 A3 | 12/2000 |
| WO | WO 03/050931 A1 | 6/2003 |

* cited by examiner

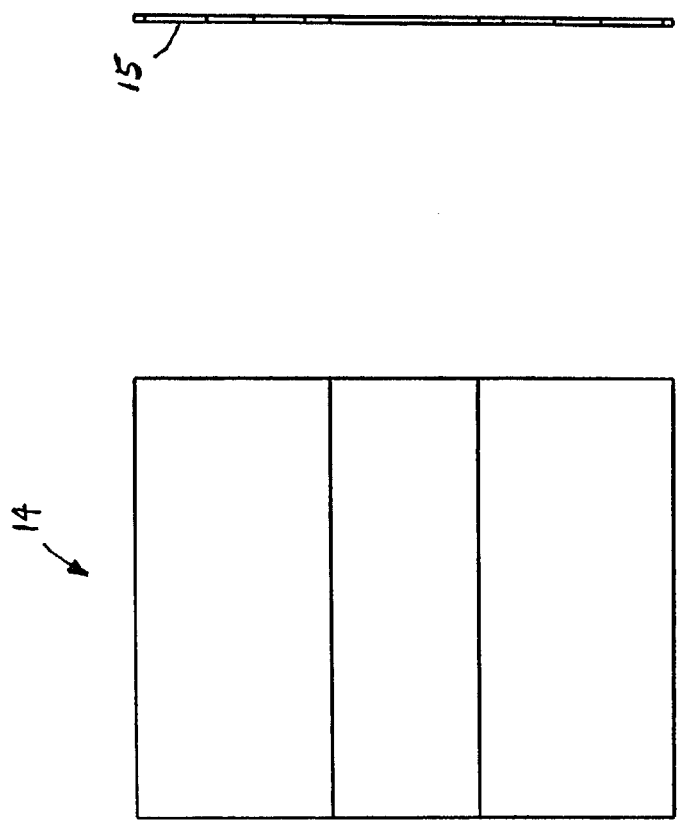
FIG. 3C
FIG. 3B
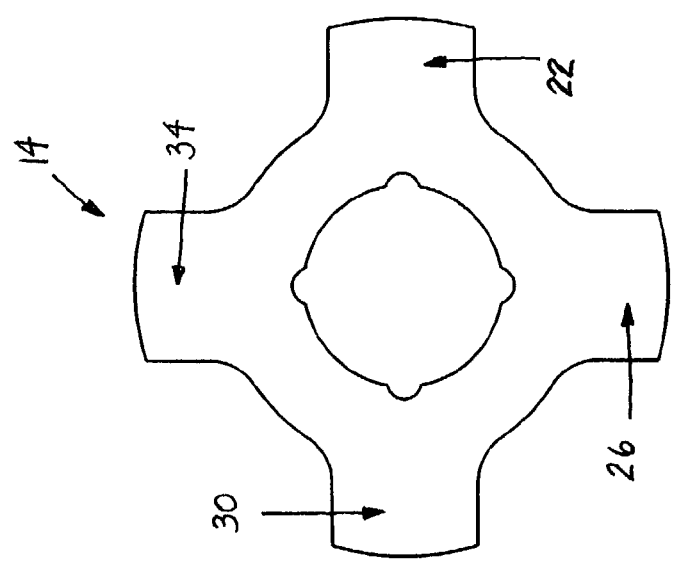
FIG. 3A

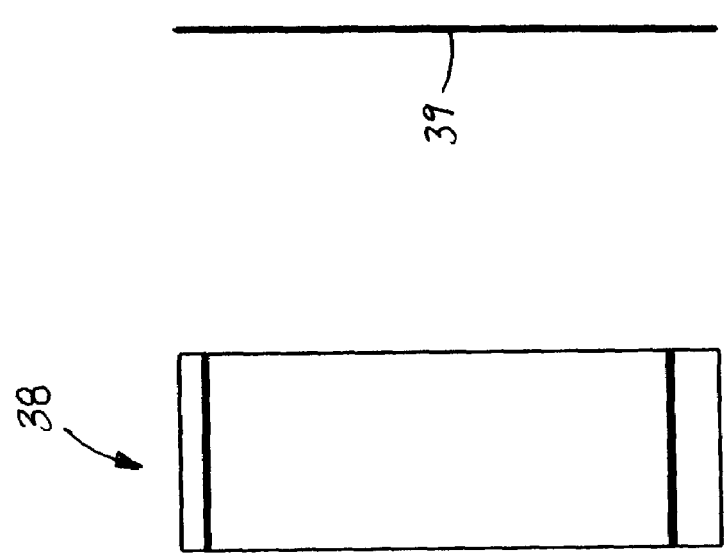
FIG. 5C
FIG. 5B
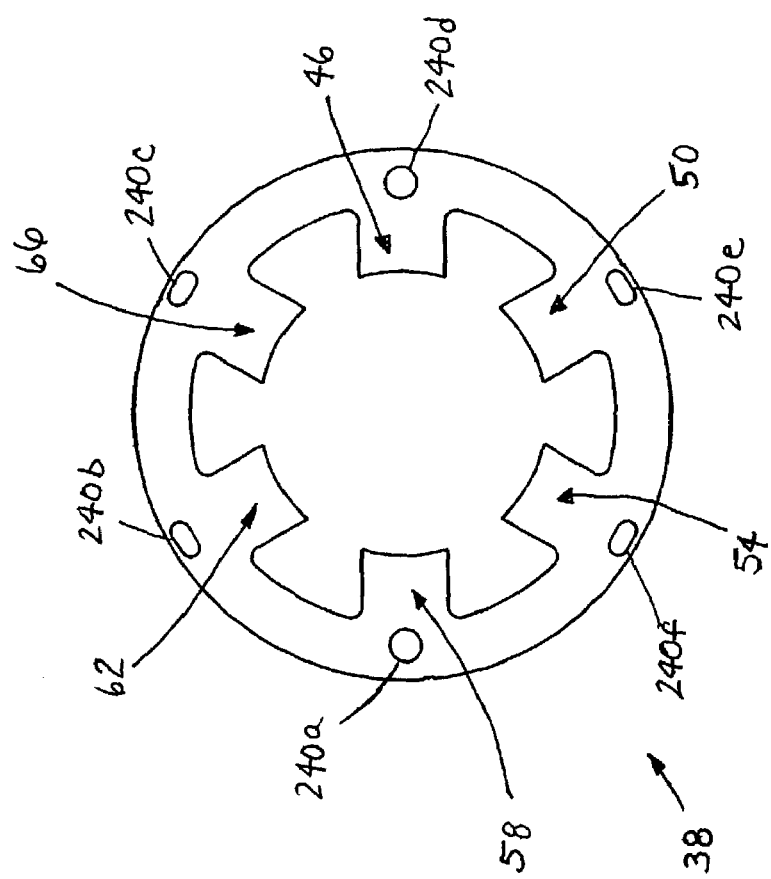
FIG. 5A

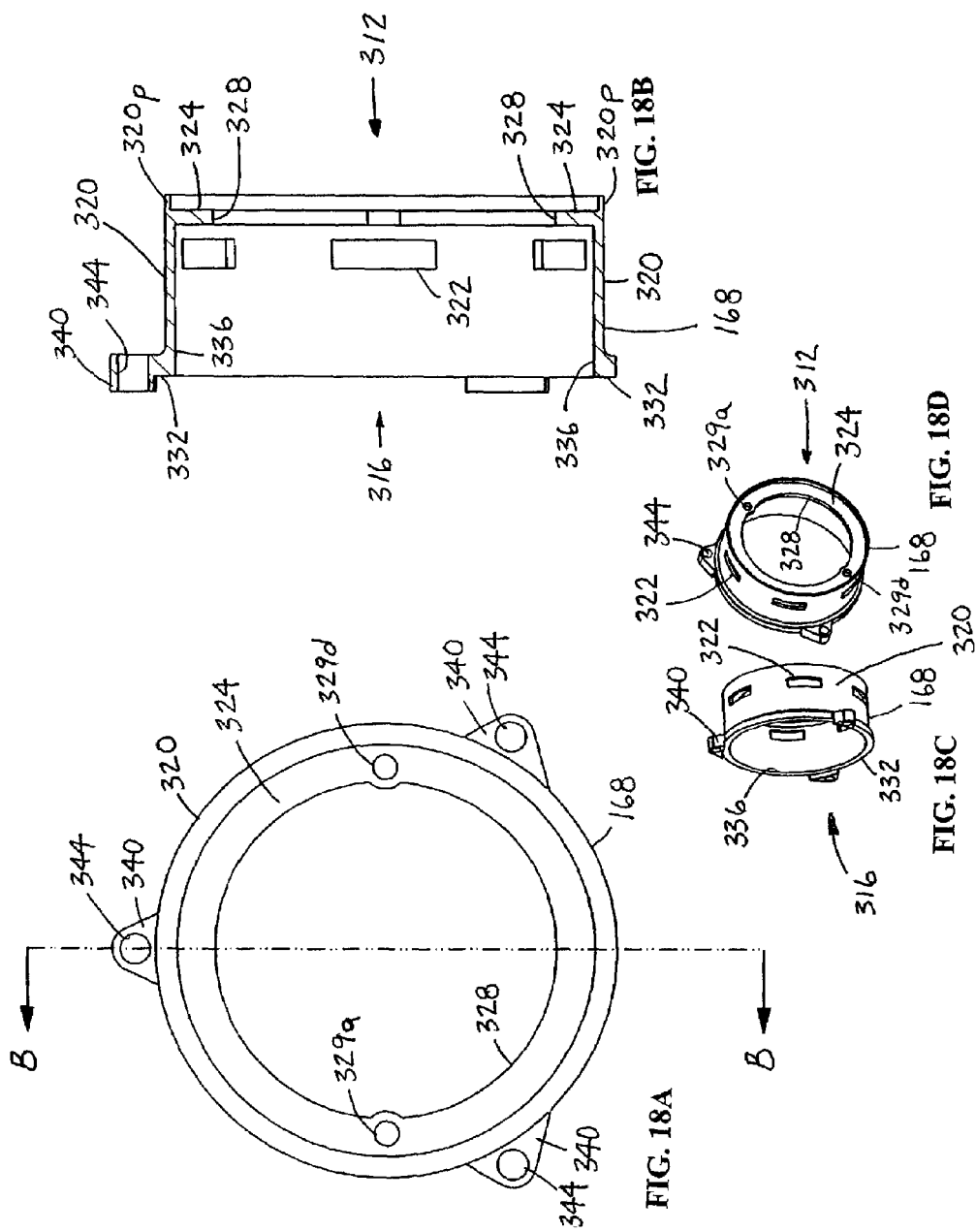

POWER TOOLS WITH SWITCHED RELUCTANCE MOTOR

RELATED APPLICATIONS

This application claims the benefit of prior filed provisional patent application, Ser. No. 60/354,253, filed Feb. 4, 2002, the entire contents of which are incorporated by reference herein.

FIELD OF THE INVENTION

The present invention relates to electrical devices that include a switched reluctance ("SR") motor and, more particularly, to power tools that include a SR motor.

BACKGROUND OF THE INVENTION

A typical SR motor includes multiple salient poles on both the stator and the rotor. Windings or coils are wound on the stator poles, and each pair of windings on diametrically opposite stator poles are connected in series or in parallel to form an electrically independent phase of the SR motor. The rotor is made of a magnetically permeable material such as, for example, a ferrous alloy. Electronics are utilized to energize the independent phases of the SR motor which thereby produce a magnetic field that interacts with the rotor poles to turn the rotor and the shaft to which the rotor is attached.

The simple design of SR motors is a feature which allows SR motors to generally last longer than other types of motors that are used in electrical devices. SR motors do not utilize permanent magnets, brushes and/or commutators as are typically used on the other types of motors. Elimination of these components reduces the maintenance needs and increases the life span of the SR motor when compared with the other types of motors.

SR motors also offer a number of other benefits over the other types of motors. These benefits include increased performance and a rugged construction for harsh environments. SR motors generally produce more torque than similarly sized models of the other types of motors. SR motors include efficiencies that are consistent over a wider range of operation and that are at least as good as the other types of motors. SR motors also include high speed and high acceleration capabilities. The benefits of SR motors make the use of SR motors desirable in a wide variety of electrical devices.

SUMMARY OF THE INVENTION

One type of electrical device that can benefit from the use of SR motors includes power tools and, more particularly, power tools configured to be hand-held during operation ("hand-held power tools"). Hand-held power tools generally include, for example, drills, circular saws, grinders, reciprocating saws, sanders, etc. These power tools typically include a housing that supports a drive unit (e.g., an electric motor) that is powered by a power source (e.g., an alternating current ("AC") corded power and/or a direct current ("DC") battery power) to drive a driven unit (e.g., a gearbox and an associated driven element such as a drill bit). The drive unit for these power tools is commonly a universal motor.

Although SR motors provide a number of benefits over the types of drive units currently used in hand-held power tools, a number of constraints have kept the SR motor from being utilized as a drive unit for such hand-held power tools. Hand-held power tools inherently need to be small enough that the operator can comfortably support and control the tool. Size and weight considerations typically dictate that such a power tool can be operated using a single hand under normal conditions. Some larger and more powerful hand-held power tools (e.g., a rotary hammer) may require two hands for operation. Regardless of the number of hands required for operation, space within the housing of these hand-held power tools is always a design consideration.

The small space design considerations result in problems when attempting to integrate a SR motor and the electronics associated with the SR motor into a hand-held power tool. The independent problems include, among others, those associated with heat dissipation, electrical noise, manufacturing tolerances, etc. SR motors are commonly used in applications including washing machines, compressors, blower units, automotive applications, etc. The space available in these applications commonly allows designers to integrate SR motors and the electronics associated with the SR motors into the device without experiencing many of the independent problems noted above with respect to the use of a SR motor and its associated electronics in a hand-held power tool.

Accordingly, in some aspects, the invention provides a hand-held power tool including a switched reluctance motor which substantially alleviates one or more of the above-described and other independent problems with existing SR motors and hand-held power tools.

In some aspects and in some constructions, the invention provides a construction that reduces tolerance stack-up. Manufacturing techniques that result in increased tolerance stack-up generally require components that have tolerances that are tighter than those tolerances required when increased tolerance stack-up is not present. Tighter tolerances therefore often correspond with higher manufacturing costs which thereby increase the overall cost of the electrical device the SR motor is integrated in.

In some aspects and in some constructions, the invention provides a self-contained electronics package that plugs into a SR motor to provide control functions to the SR motor. The electronics package can be quickly replaced and/or removed for service.

In some aspects and in some constructions, the invention provides enhanced cooling that keeps the electronics and the components of the SR motor cool for efficient operation.

In some aspects and in some constructions, the invention provides an encapsulated magnet that allows for contaminant free motor control over the life of the SR motor. The magnet is physically protected from contaminants such that contaminants cannot form on the magnet and thereby affect the motor control.

In some aspects and in some constructions, the invention provides an apparatus and a method for aligning magnet poles of a magnet hub with respect to the rotor poles the magnet poles represent.

The aspects of the invention that alleviate the integration problems for hand-held power tools may also provide benefits in electrical devices other than hand-held power tools. For example, the aspects may increase the efficiencies of the operation of SR motors used in other electrical devices and/or reduce costs associated with producing and/or servicing the SR motors and the electronics associated with the SR motors of the other electrical devices. Additionally, some aspects of the invention may further be applicable for use in electrical devices that utilize other types of motors.

It is an independent advantage of the invention to provide a power tool that is configured to be hand-held during operation that is driven by a switched reluctance motor. It is an independent advantage of the invention to provide a construction that reduces tolerance stack-up. Also, it is an independent advantage of the invention to provide a self-contained electronics package that plugs into a SR motor to provide control functions to the SR motor. In addition, it is an independent advantage of the invention to provide enhanced cooling that keeps the electronics and the components of the SR motor cool for efficient operation. Further, it is an independent advantage of the invention to provide an encapsulated magnet that allows for contaminant free motor control over the life of the SR motor. It is an independent advantage to provide an apparatus and a method for aligning magnet poles of a magnet hub with respect to the rotor poles the magnet poles represent.

Other independent features and independent advantages of the invention will become apparent to those skilled in the art upon review of the following detailed description, claims, and drawings.

BRIEF DESCRIPTION OF THE DRAWINGS

In the drawings:

FIGS. 3A, 3B, and 3C illustrate a rotor construction of the switched reluctance motor of FIG. 2.

FIGS. 5A, 5B, and 5C illustrate a stator construction of the switched reluctance motor of FIG. 2.

FIGS. 18A, 18B, 18C, and 18D illustrate a front bell of the stator assembly of FIGS. 10 and 11.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items.

DETAILED DESCRIPTION

Figure 1:
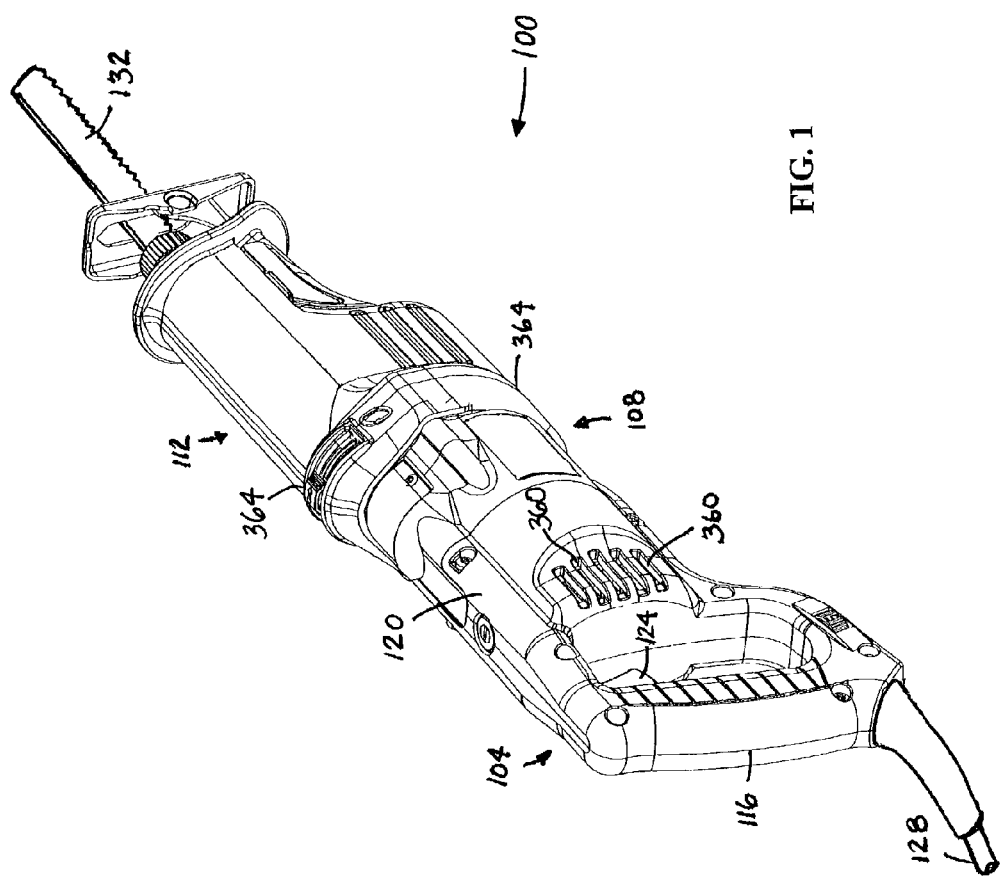
FIG. 1 is a perspective view of an electrical device embodying the invention.

FIG. 1 illustrates an electrical device 100 embodying aspects of the invention. In the illustrated construction and in some aspects, the electrical device 100 is a power tool, and, more particularly, a power tool configured to be hand-held during operation (i.e., the electrical device 100 is a power tool designed to be supported by an operator, and not normally supported on a surface, such as a workbench, during operation). In the illustrated construction, the electrical device 100 is a reciprocating saw. It should be understood that aspects of the invention apply equally to any electrical device that includes a SR motor, such as, for example other power tools configured to be hand-held during operation (e.g., drills, circular saws, grinders, reciprocating saws, sanders, caulk guns, jigsaws, screwdrivers, heat guns, impact wrenches, shears, nibblers, rotary hammers, routers, hand planers, plate jointers, rotary tools, etc.), power tools not configured to be hand-held during operation (e.g., miter saws, planers, drill presses, table saws, lathes, etc.) and other types of electrical devices (e.g., washing machines, compressors, blower units, automotive applications, etc.). In the illustrated construction, the electrical device 100 includes a control housing 104, a drive unit housing 108 and a driven unit housing 112. In other constructions, more or fewer housing sections may be utilized (e.g., a single housing formed of two corresponding halves).

A first end 116 of the control housing 104 is configured to fit an operator's hand, and a second end 120 of the control housing 104 houses a majority of an electronics package discussed below in more detail. A trigger 124 is actuated by the operator to operate the electrical device 100 by selectively connecting a power source (not shown) to the SR motor of the electrical device 100. In the illustrated construction, a power cord 128 electrically connects the electrical device 100 to an AC power source. Other constructions may include a battery pack that acts as a DC power source, a combination of an AC and a DC power source, and/or any other type of power source.

The drive unit housing 108 is coupled to the control housing 104 and houses the drive unit (i.e., a SR motor and components associated with the SR motor). The driven unit housing 112 is coupled to the drive unit housing 108 and houses the driven unit. The driven unit of the illustrated electrical device 100 includes a toothed blade 132 which cuts in a reciprocating type motion. The driven unit may be any type of driven unit and shall therefore not be discussed further in detail.

Figure 2:
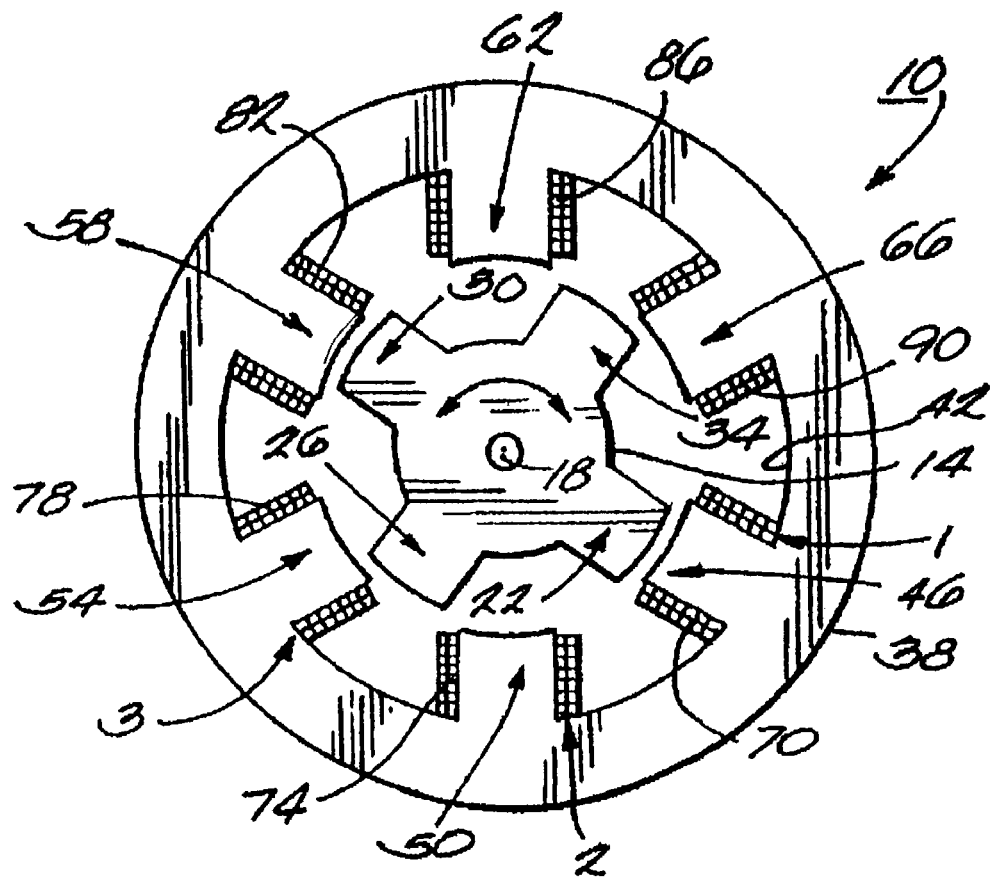
FIG. 2 is a simplified schematic representation of a switched reluctance motor.
Figure 4:
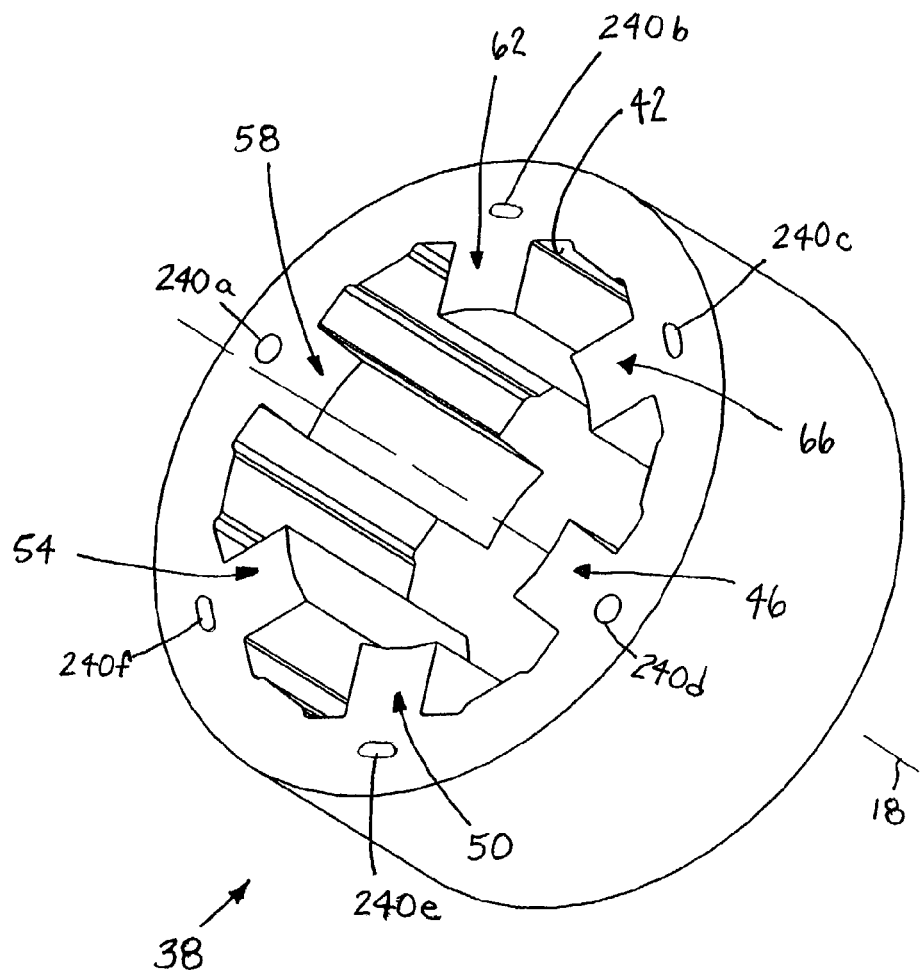
FIG. 4 illustrates a perspective view of a stator of the switched reluctance motor of FIG. 2.

FIG. 2 illustrates a schematic view of a representative SR motor 10. The SR motor 10 includes a rotor 14 mounted for rotation about an axis 18, and a stator 38 surrounding the rotor 14. The rotor 14 includes four rotor poles 22, 26, 30 and 34 evenly spaced about the axis 18, and extending radially outward from the rotor 14 relative to the axis 18. The stator 38 has an inner surface 42, and six stator poles 46, 50, 54, 58, 62 and 66 evenly spaced about the inner surface 42, and extending from the inner surface 42 radially inwardly toward the axis 18. FIGS. 3A and 3B further illustrate one construction of the rotor 14 in more detail. In one construction, the rotor 14 is constructed of a number of laminations 15 as shown in FIG. 3C. FIG. 4 illustrates a perspective view of the stator 38 and FIGS. 5A and 5B further illustrate one construction of the stator 38 in more detail. In one construction, the stator 38 is constructed of a number of laminations 39 as shown in FIG. 5C. As shown in FIGS. 4 and 5A, the stator 38 includes a number of apertures 240, any number of which may extend axially through the stator 38. In one construction, two diametrically opposite apertures 240a and 240d include a round shaped cross-section and the remaining four apertures 240b, 240c, 240e and 240f include an oblong shaped cross-section. In other constructions, the positioning of the apertures 240, the shape of the cross-sections of the apertures 240 and/or the number of apertures 240 may vary. In alternative constructions, other types of positioning features could be utilized.

Because the SR motor 10 includes six stator poles and four rotor poles, the SR motor 10 shown in FIG. 2 is referred to as a 6/4 (six stator pole to four rotor pole ratio) SR motor. While the description refers to the operation of the invention in terms of a 6/4 SR motor, it should be understood that any SR motor having any number of stator poles or rotor poles can be utilized as the drive unit in the electrical device 100.

The SR motor 10 also includes windings or coils 70, 74, 78, 82, 86 and 90 on the stator poles 46, 50, 54, 58, 62 and 66, respectively. The windings 70, 74, 78, 82, 86 and 90 are made of a conductor of a precise gauge which is wound around the corresponding stator pole 46, 50, 54, 58, 62 and 66 a precise number of times or turns. The gauge of the wire and the number of turns vary depending upon the application of the SR motor 10. The description applies equally to any SR motor using any gauge wire or having any number of turns.

The windings 70, 74, 78, 82, 86 and 90 on diametrically opposite stator poles 46, 50, 54, 58, 62 and 66, respectively, are connected in series to form three electrically independent phases 1, 2 and 3 of the SR motor 10. In an alternative construction, the windings 70, 74, 78, 82, 86 and 90 could be connected in parallel to form the three electrically independent phases 1, 2 and 3. As shown in FIG. 2, the windings 70 and 82 on stator poles 46 and 58, respectively, form pole pairs which together form phase 1. The windings 74 and 86 on stator poles 50 and 62, respectively, form pole pairs which together form phase 2. The windings 78 and 90 on stator poles 54 and 60, respectively, form pole pairs which together form phase 3. Because the rotor 14 is made of ferromagnetic material, energizing a particular phase of the SR motor 10 results in the formation of a magnetic attraction between the windings on the stator pole pairs comprising the energized phase and the rotor poles closest to the stator poles of the energized phase. By energizing the phases 1, 2 and 3 in a particular manner, the rotational direction and speed of the rotor 14 can be precisely controlled.

Figure 6:
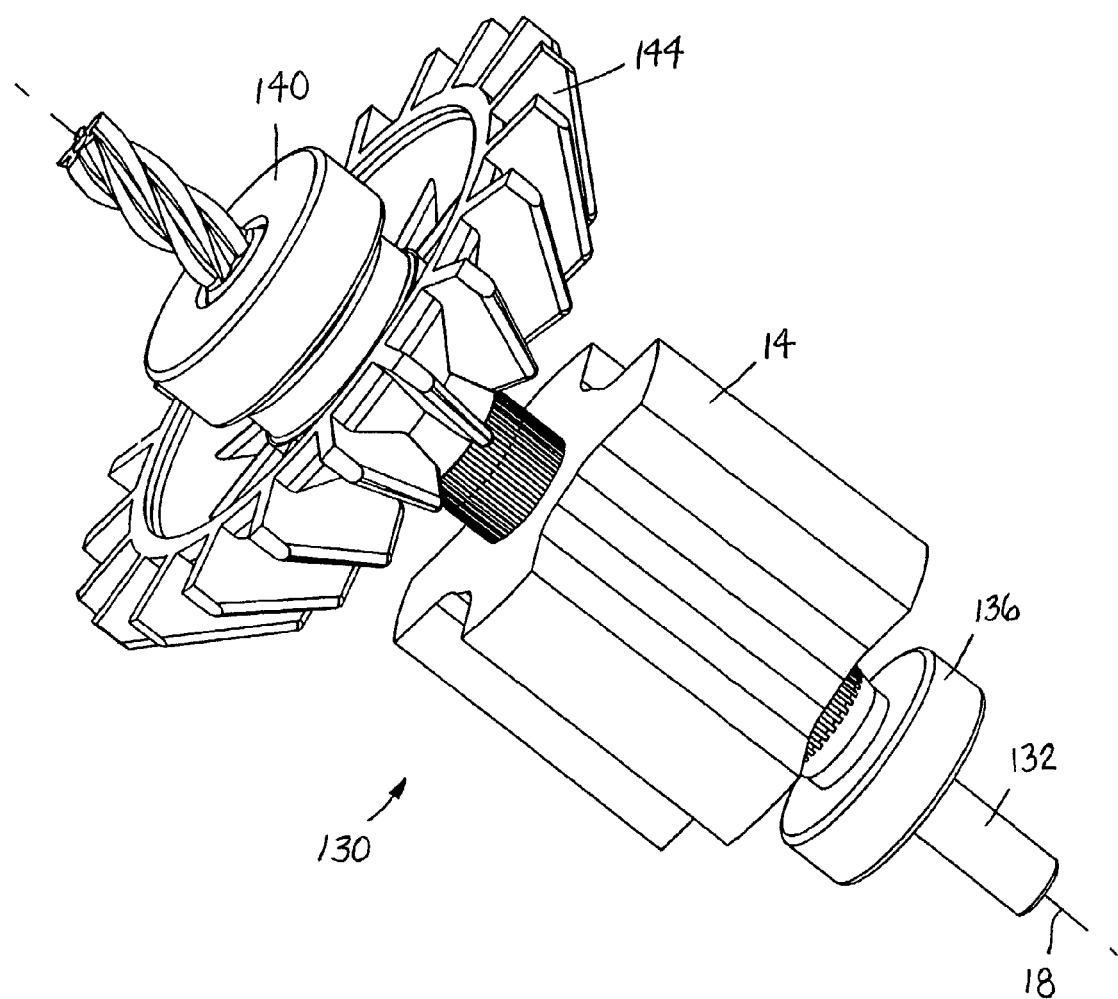
FIG. 6 illustrates a perspective view of a rotor assembly of the electrical device illustrated in FIG. 1.
Figure 7:
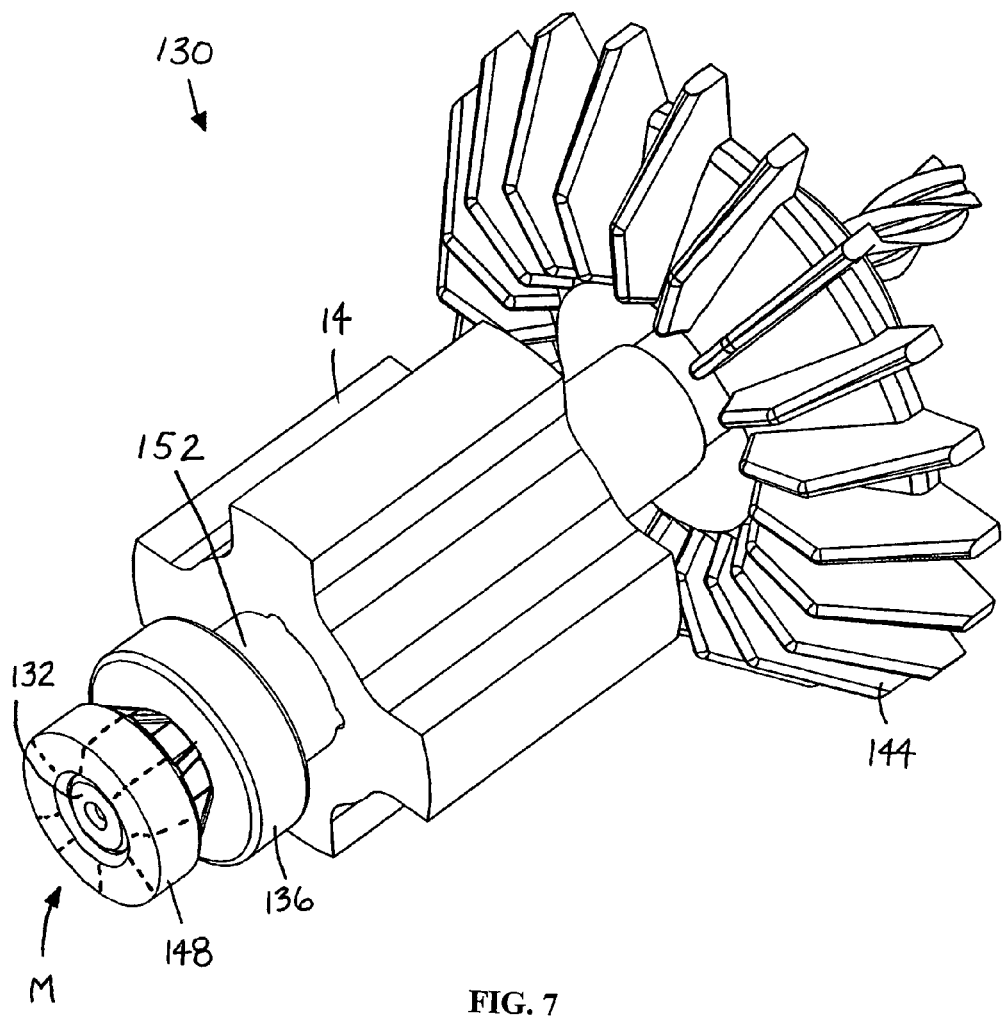
FIG. 7 illustrates the rotor assembly of FIG. 6 including a magnet hub and a shaft tube.

FIG. 6 illustrates a rotor assembly 130. The rotor assembly 130 includes a shaft 132 to which the rotor 14 is mounted for rotation about the axis 18. The shaft 132 rotates in response to rotational forces caused by the rotor 14 in accordance with operation of the SR motor 10 (e.g., in a forward direction and/or in a reverse direction as selectively indicated by the operator of the electrical device 100 (dependent upon the construction of the electrical device 100)). The shaft 132 is supported for rotational movement about the axis 18 by a first bearing 136 and a second bearing 140. A fan 144 is also coupled to the shaft 132. The fan 144 is utilized to dissipate heat from the electrical device 100 as discussed below. As illustrated in FIG. 7, a magnet hub 148 may also be mounted to the shaft 132. The magnet hub 148 includes magnet poles M (not individually shown). In one construction, the magnet hub 148 includes eight magnet poles M (i.e., two magnet poles M per rotor pole). In alternative constructions, the magnet hub 148 may include any number of magnet poles M. The magnet hub 148 may further include any number of magnets that include any number of magnet poles M to provide the overall number of magnet poles M of the magnet hub 148 (e.g., to achieve a total of eight magnet poles M, the magnet hub 148 may include eight magnets with eight magnet poles M, or one magnet with 8 magnet poles M, or two magnets with two magnet poles M each and one magnet with four magnet poles M, etc.). The magnet poles M may be utilized, as discussed below, to determine the speed at which the shaft 132 is rotating, the direction in which the shaft 132 is rotating and the position of the rotor 14 with respect to the stator 38.

Figure 8:
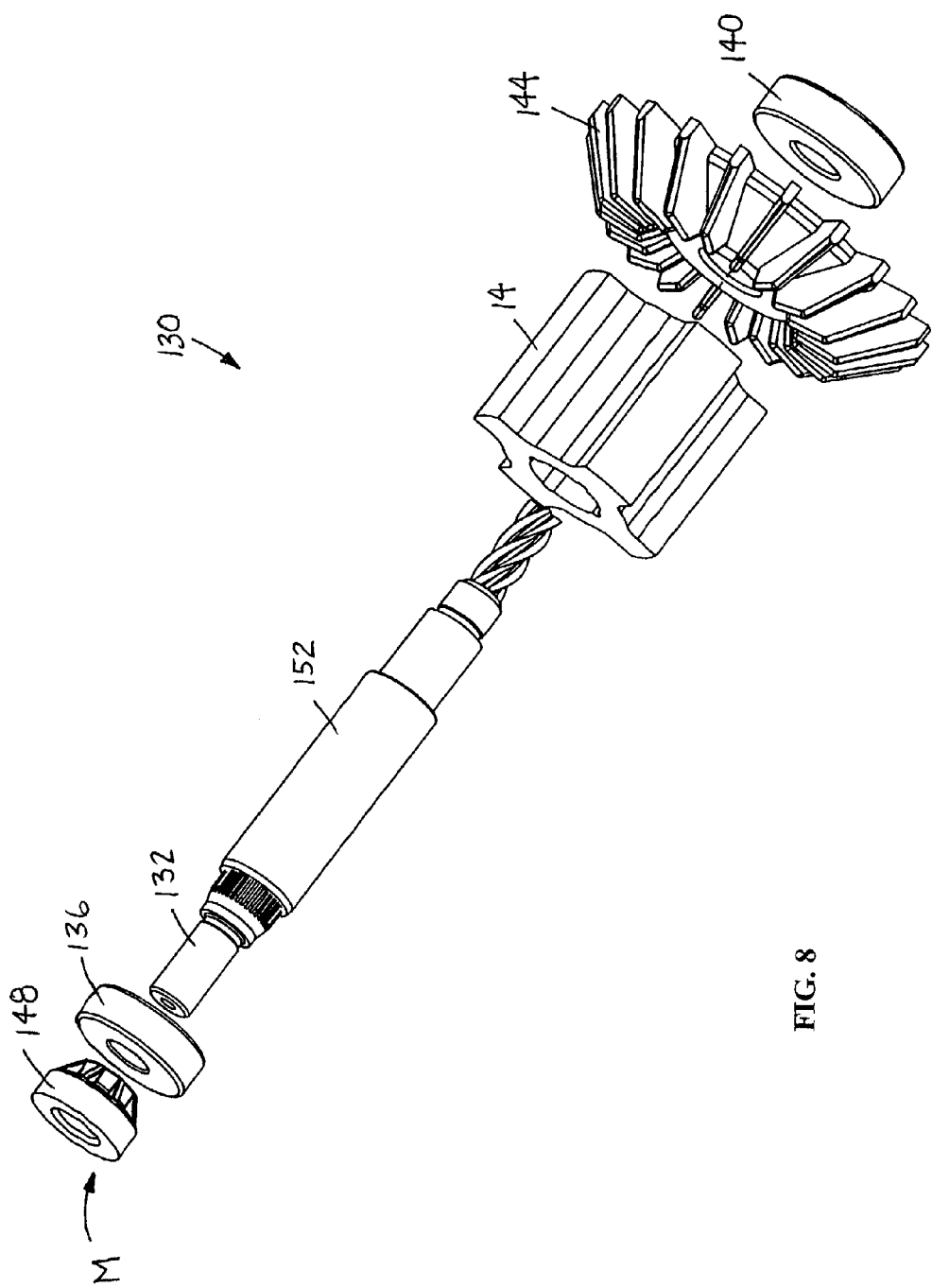
FIG. 8 illustrates an exploded view of the rotor assembly of FIG. 7.
Figure 9:
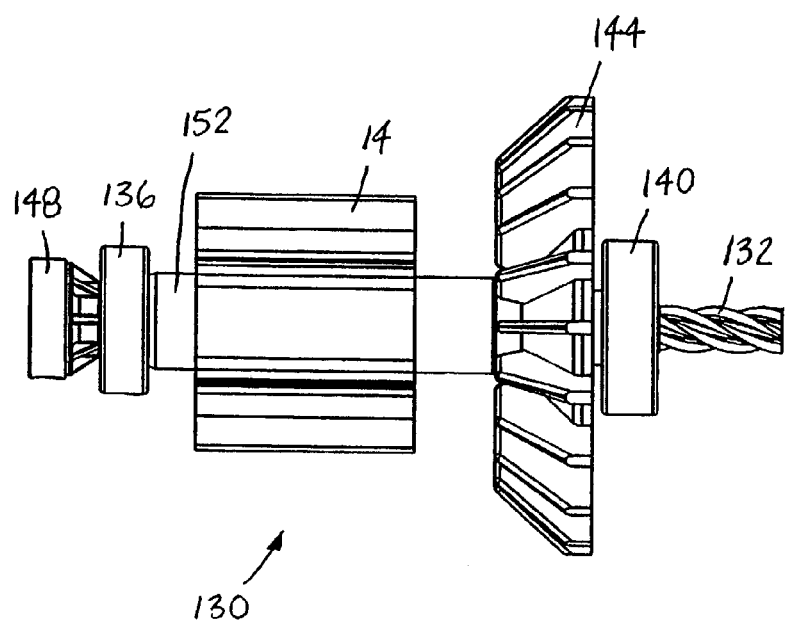
FIG. 9 illustrates a side view of the rotor assembly of FIG. 7.

FIG. 8 illustrates an exploded view of and FIG. 9 illustrates a side view of the rotor assembly 130. A shaft tube 152 may be coupled to the shaft 132 radially inward of the rotor 14. In one construction, the shaft tube 152 may electrically insulate the rotor 14 from the shaft 132.

Figure 10:
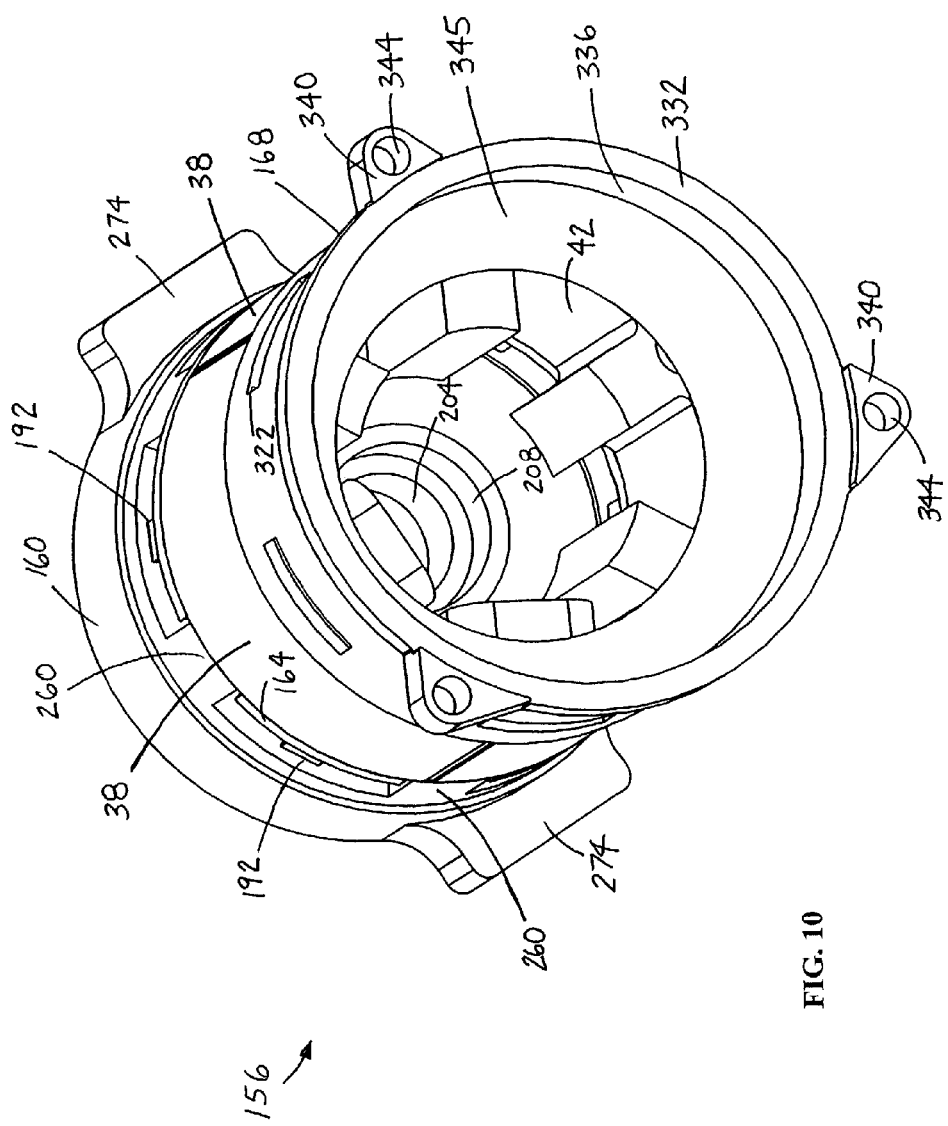
FIGS. 10 and 11 illustrate perspective views of a stator assembly of the electrical device illustrated in FIG. 1.
Figure 11:
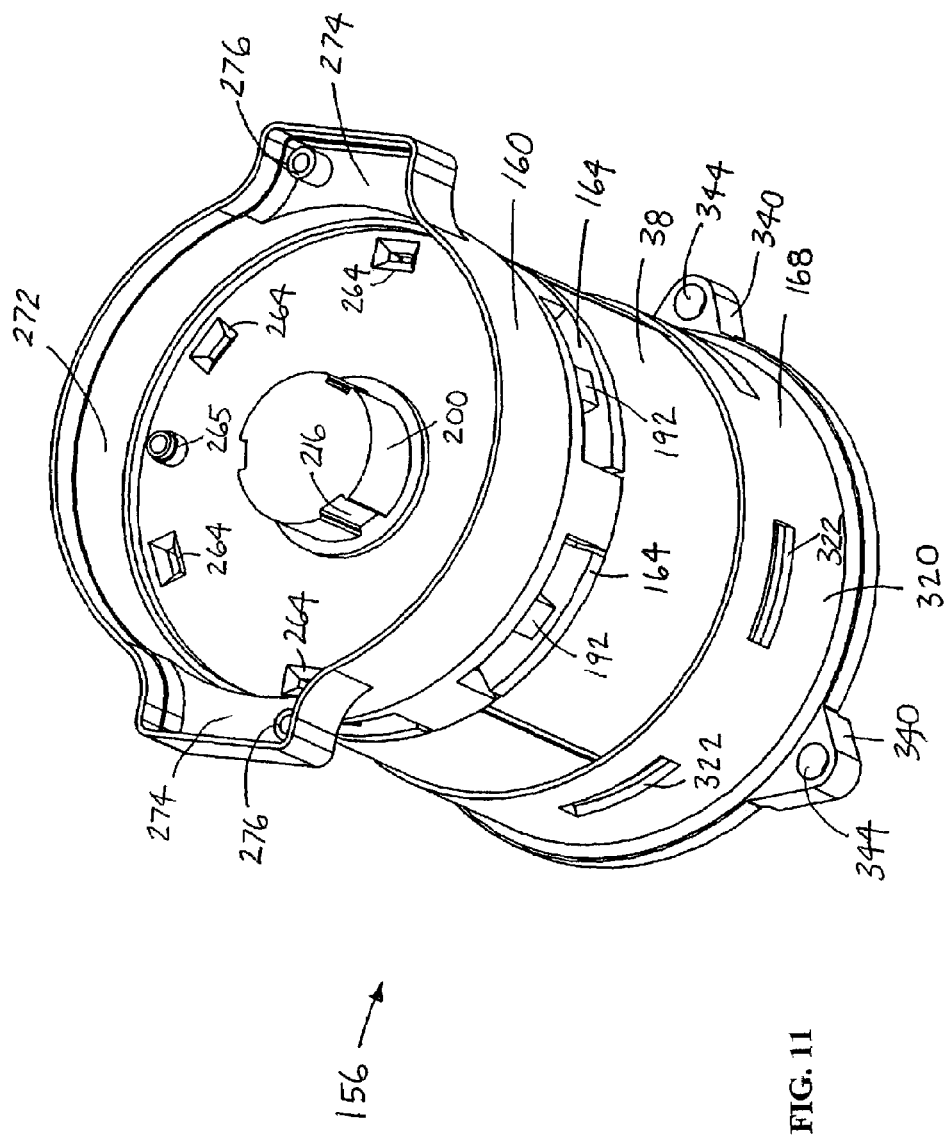
Figure 12:
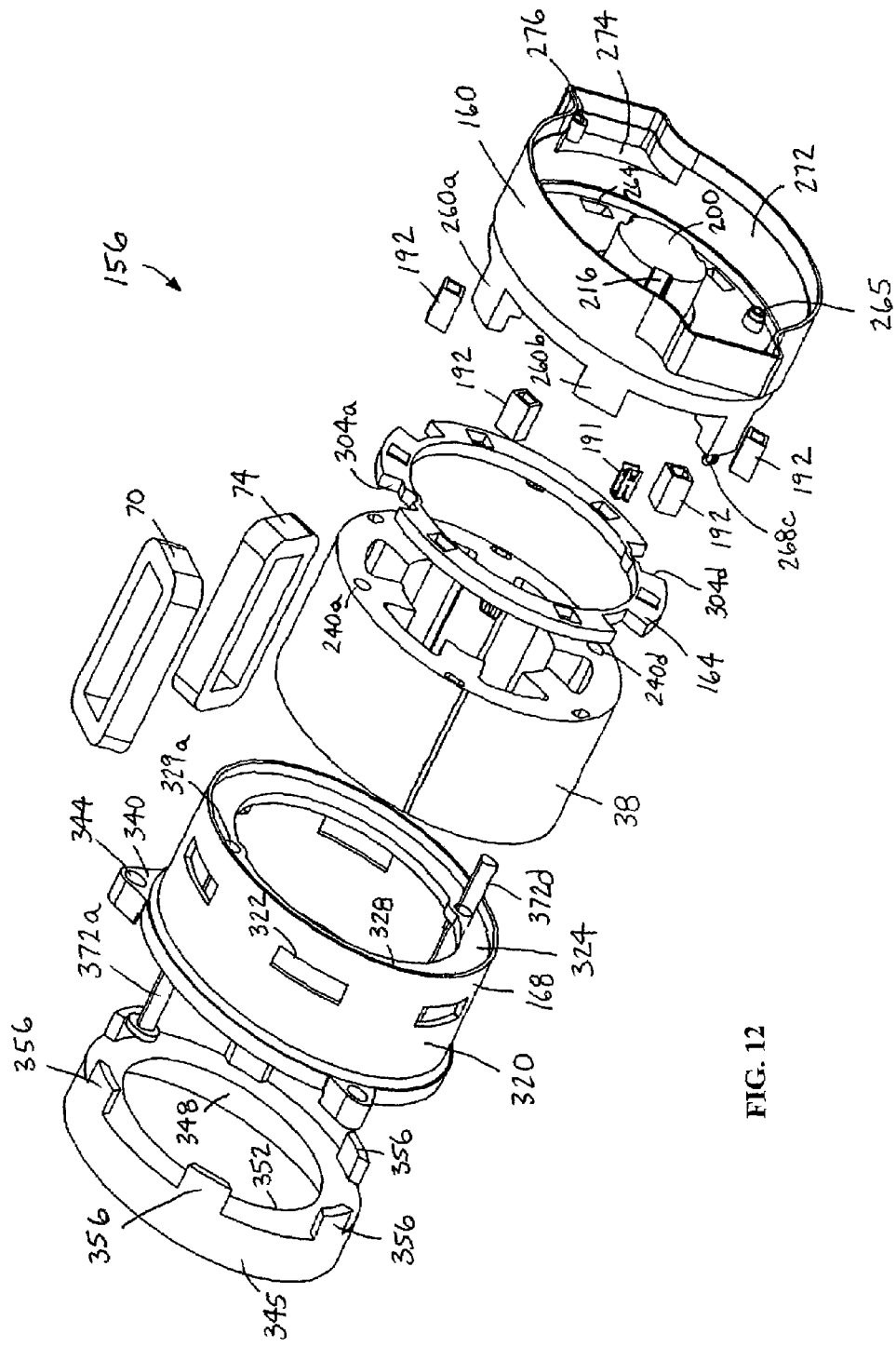
FIG. 12 illustrates an exploded view of the stator assembly of FIGS. 10 and 11.
Figure 13:
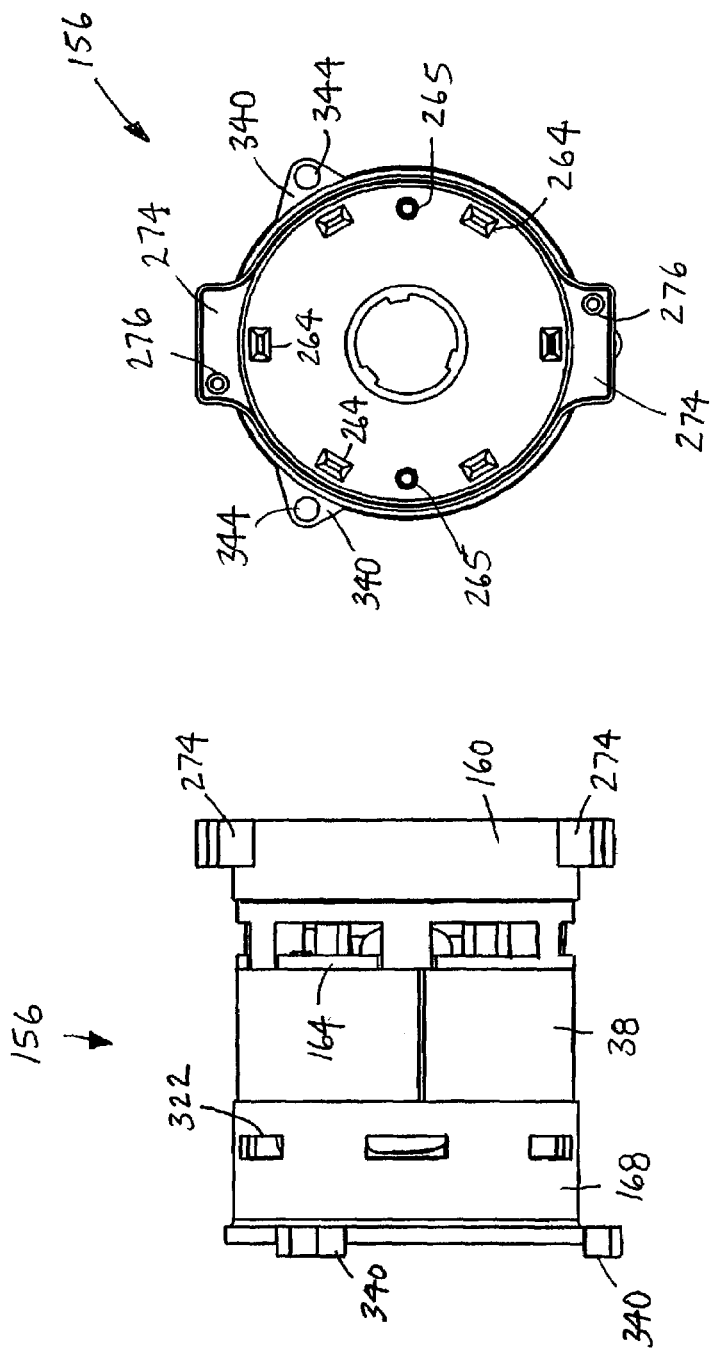
FIGS. 13A and 13B illustrate a side and an end view of the stator assembly of FIGS. 10 and 11.
Figure 14:
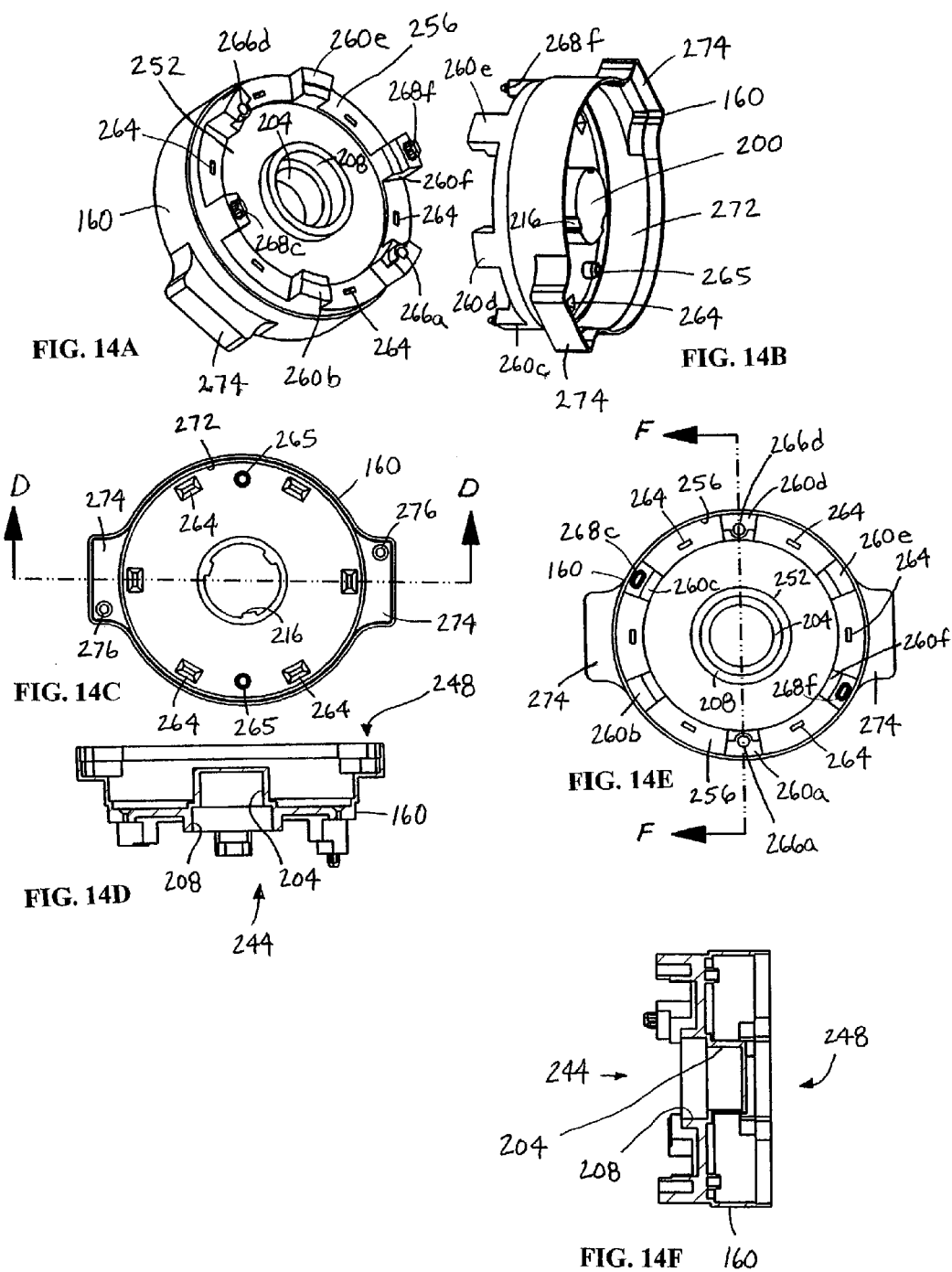
FIGS. 14A, 14B, 14C, 14D, 14E, and 14F illustrate a rear bell of the stator assembly of FIGS. 10 and 11.

FIGS. 10 and 11 illustrate a stator assembly 156 that includes the stator 38, a rear bell 160, a terminal board 164 and a front bell 168. FIG. 12 illustrates an exploded view of and FIGS. 13A and 13B illustrate a side view and an end view of the stator assembly 156.

Figure 15:
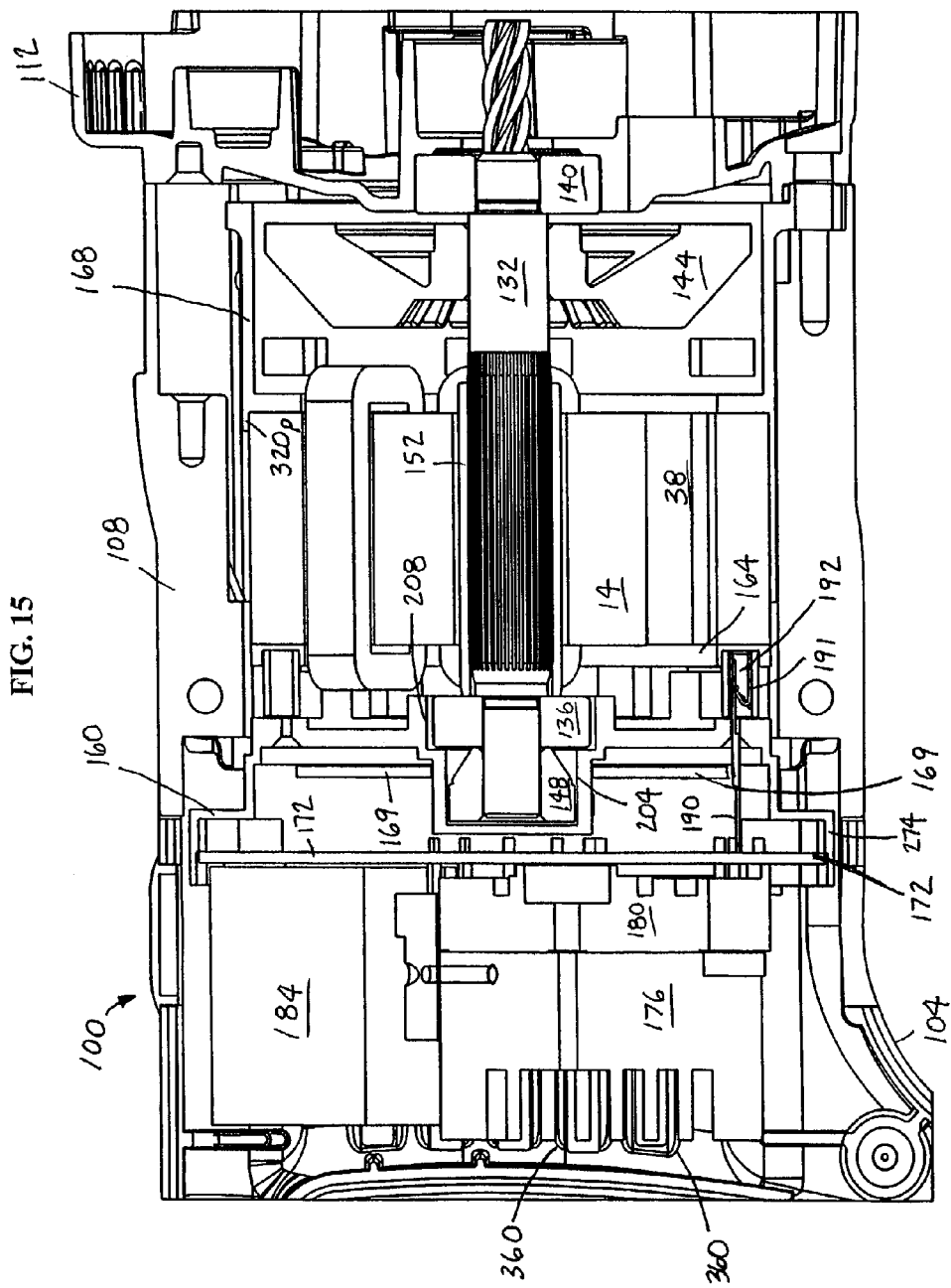
FIGS. 15 and 16 illustrate partial sectional views of the electrical device illustrated in FIG. 1.
Figure 16:
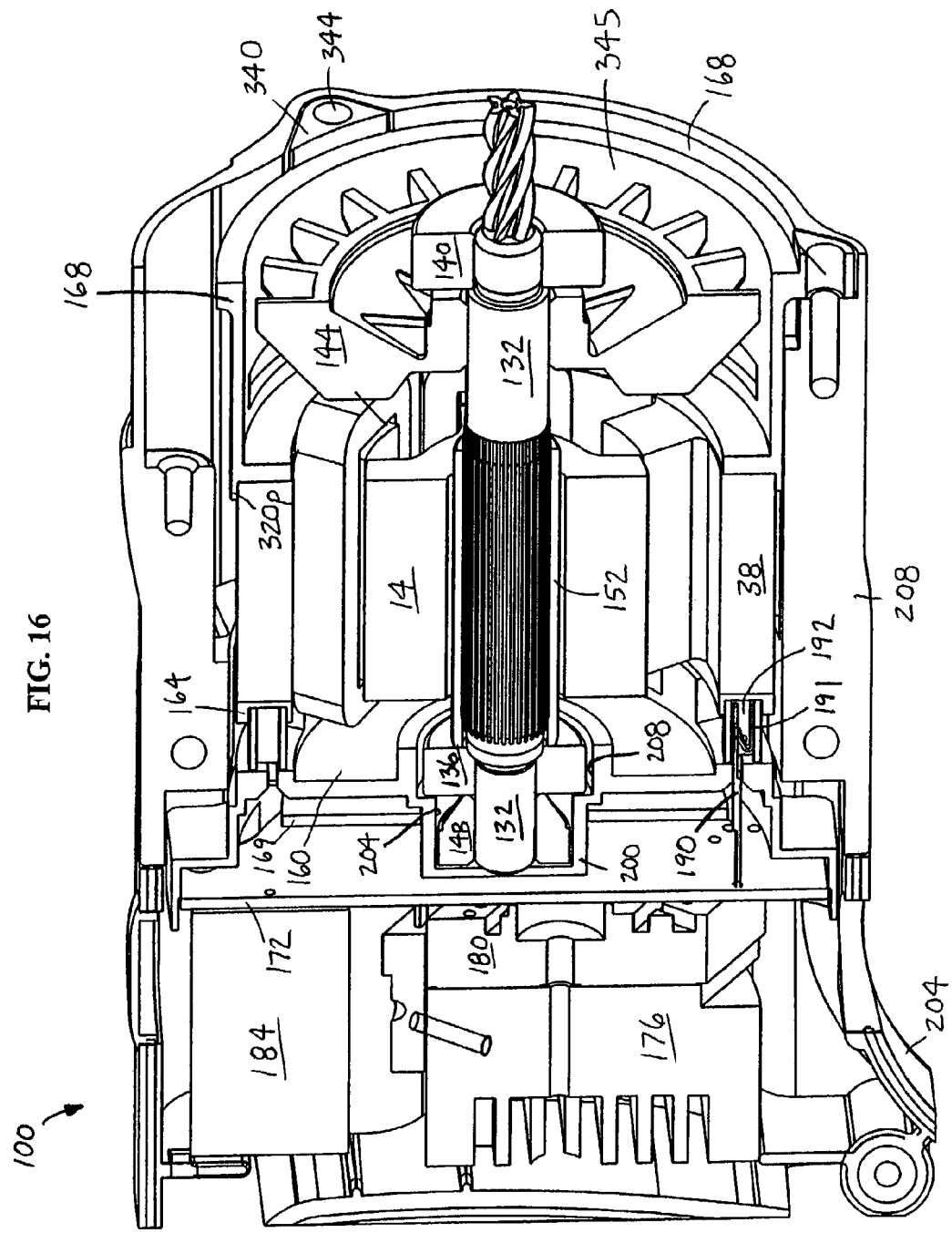

As shown in FIGS. 14A, 14B, 14C, 14D, 14E, and 14F, the rear bell 160 includes a first side 244, a second side 248 and a stepped hub 200 having a magnet pocket 204 and a bearing pocket 208. The first side 244 includes an opening to the stepped hub 200. The opening allows the magnet hub 148 and the first bearing 136 to pass through the first side 244 into the stepped hub 200. As shown in FIGS. 15 and 16, when the electrical device 100 is assembled as discussed below, the magnet hub 148 is encapsulated between the stepped hub 200 and the first bearing 136. The magnet hub 148 is allowed to rotate in the magnet pocket 204 and the first bearing 136 is seated in the bearing pocket 208 such that no contaminants can reach the magnet hub 148 as discussed below in more detail.

The first side 244 also includes a first annular region 252 which is positioned radially adjacent and outward of the opening to the stepped hub 200, and a second annular region 256 which is positioned radially adjacent and outward of the first annular region 252. The first annular region 252 is substantially planar. The second annular region 256 includes a number of spacer blocks 260 that extend axially away from the plane of the first annular region 252 in a direction opposite the direction of the second side 248. The second annular region 256 also includes a number of contact apertures 264 that allow contacts of the electronics package to pass through. In one construction, the number of contact apertures 264 corresponds to the number of contacts.

In one construction, the second annular region 256 includes six spacer blocks 260a, 260b, 260c, 260d, 260e and 260f which are evenly spaced about the circumference of the second annular region 256. As discussed above, the positioning features utilized may vary. The spacer blocks 260a and 260d include apertures 266a and 266d, respectively. In one construction, the apertures 266a and 266d include a round shaped cross-section corresponding to the round shaped cross-section of apertures 240a and 240d. In one construction, the apertures 266a and 266d do not extend to the second side 248. The spacer blocks 260c and 260f include pin members 268c and 268f, respectively. In one construction, the pin members 268c and 268f include an oblong shaped cross-section corresponding to the oblong shaped cross-section of apertures 240c and 240f. In one construction, apertures 240c and 240f are configured to receive pin members 268c and 268f. In one construction, the spacer blocks 260b and 260e are axially shorter than the spacer blocks 260a, 260c, 260d and 260f. The spacer blocks 260b and 260e may be shorter than the spacer blocks 260a, 260c, 260d and 260f by an amount corresponding approximately to the thickness of the terminal plate 164. The spacer blocks 260c and 260f include a protrusion (i.e., pin members 268c and 268f) that results in an overall height profile that is taller than the remaining blocks. However, the pin members 268c and 268f are utilized such that, when the stator assembly 156 is assembled as discussed below, each spacer block 260a, 260b, 260c, 260d, 260e and 260f rests flush against a corresponding surface.

The second side 248 of the rear bell 160 includes an exterior stepped annular wall and a closed end of the stepped hub 200. The second side 248 also includes the contact apertures 264 and apertures 265. In one construction, the apertures 265 do not extend to the first side 244. The aperture 265 may be utilized to retain the printed circuit boards to the rear bell 160. The second side 248 is surrounded by a circumferentially positioned annular wall 272 that extends axially away from the plane of the first annular region 252 in a direction opposite the first side 244. The annular wall 272 extends axially such that each printed circuit board ("PCB") of the electronics package is radially enclosed by the annular wall 272 as discussed below. In one construction, the annular wall 272 includes two diametrically opposed flange portions 274. Each flange portion 274 may includes an aperture 276. In one construction, the aperture 276 is located on the second side 248 of the flange portion 274 and does not extend through to the first side 244 of the flange portion 274. The aperture 276 may be utilized to retain the PCBs to the rear bell 160.

Figures 17A, 17B:
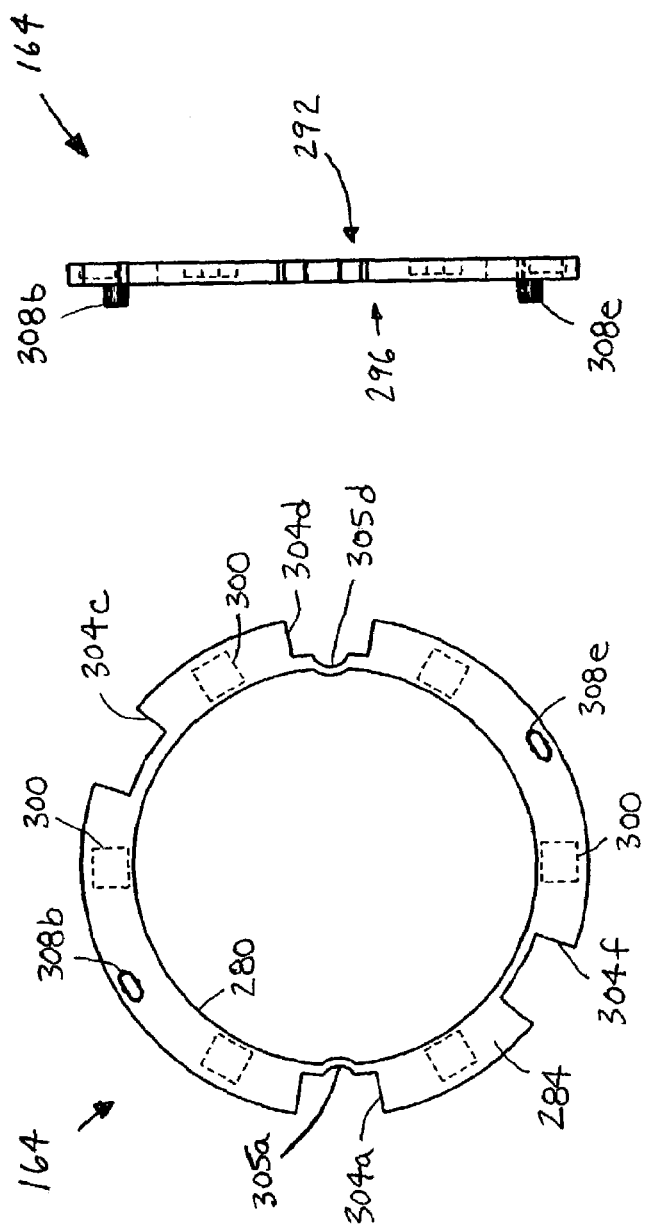
FIGS. 17A and 17B illustrate an end and a side view of a terminal board of the stator assembly of FIGS. 10 and 11.

As shown in FIG. 17A, the terminal board 164 includes an aperture 280. Radially adjacent and outward of the aperture 280 the terminal board 164 includes an annular region 284. The aperture 280 is preferably sized such that the annular region 284 substantially similar in size to the second annular region 256 of the first side 244 of the rear bell 160. The annular region 284 includes a number of cutouts 304a, 304c, 304d and 304f. In one construction, the cutouts 304a and 304d include a recess 305a and 305d, respectively, having a half-round cross section corresponding to a portion of the round shaped cross-section of the apertures 240a and 240d. In one construction, the spacing of the cutouts 304a, 304c, 304d and 304f corresponds to the spacing of the spacer blocks 260a, 260c, 260d and 260f (i.e. the spacer blocks that include the apertures 266a and 266d and the pin members 268c and 268f). The annular region 284 includes a first side 292 and a second side 296. The first side 292 is substantially planar. The second side 294 includes a number of pin members 308b and 308e. In one construction, the pin members 308b and 308e include an oblong shaped cross-section corresponding to the oblong shaped cross-section of the apertures 240b and 240e. In one construction, the apertures 240b and 240e are configured to receive pin members 304b and 304e. The second side 296 also includes placement locations 300 for placement of terminal blocks 192. In one construction, the terminal blocks 192 are attached to the terminal board 164 with an adhesive. In another construction, the terminal blocks 192 are integral with the terminal board 164. The terminal blocks 192 include female connectors 191. The female connectors 191 are electrically coupled to representative conductors that make up the stator windings of the SR motor 10. As discussed further below, contacts of the electronics package engage the female connectors 191 thereby releasably electrically coupling the electronics package to the electrically independent phases. FIGS. 15 and 16 illustrate the releasable engagement. In one construction, the placement locations 300 are spaced such that the spacing of the female connectors 191 in the terminal blocks 192 corresponds to the spacing of the representative contacts that releasably engage the female connectors 191. In other constructions, the terminal blocks 192 may include male connectors.

Referring to FIGS. 18A, 18B, 18C, and 19D, the front bell 168 includes a first end 312 and a second end 316. The first end 312 is configured to be adjacent to the stator 38. The second end is configured to be adjacent to the gearbox of the driven unit which is housed in the driven unit housing 112. A circumferentially positioned annular wall 320 connects the first end 312 to the second end 316. The circumferentially positioned annular wall 320 includes a number of air inlet vents 322. The air inlet vents 322 may be utilized as part of the heat dissipation techniques discussed below.

The first end 312 includes an annular region 324 radially adjacent and outward of an aperture 328. The aperture 328 is sized such that the annular region 324 is substantially similar in size to the radially outward portion of the stator core. In one construction, the circumferentially positioned annular wall 320 includes a positioner portion 320p that extends axially beyond the annular region 324. The positioner portion 320p of the circumferentially positioned annular wall 320 may be utilized to position the front bell 168 with respect to the stator 38. The positioner portion 320p is located radially outward of the stator 38 when utilized to position the front bell 168 with respect to the stator 38. The annular region 324 includes apertures 329a and 329d. In one construction, the apertures 329a and 329d include a round shaped cross-section corresponding to the round shaped cross-section of apertures 240a and 240d.

The second end 316 also includes an annular region 332 radially adjacent and outward of an aperture 336. The aperture 336 is sized such that the annular region 332 is substantially similar in size to the corresponding surface of the driven unit housing 112. The annular region 332 includes a number of tabs 340. The tabs 340 include apertures 344 that allow fasteners to pass through which are utilized to position the stator assembly 156 with respect to the drive unit housing 108 and the driven unit housing 112.

Referring to FIG. 12, a fan baffle 345 is configured to direct heated air propelled by the fan 144 out of the electrical device 100. The fan baffle 345 is supported by the annular region 324 and the circumferentially annular wall 320 of the front bell 168. The fan baffle 345 includes an annular region 348 radially adjacent and outward of an aperture 352. The aperture 352 is sized such that the annular region 348 is substantially similar in size to the annular region 324. The annular region 348 includes a triangular shaped cross-section corresponding to the cross-section shape of each blade member of the fan 144. The fan baffle 345 includes a number of spacer blocks 356 that extend axially towards the annular region 324. In one construction, the spacer blocks 356 are configured such that the air inlet holes 322 are not blocked by the fan baffle 345.

Figure 19:
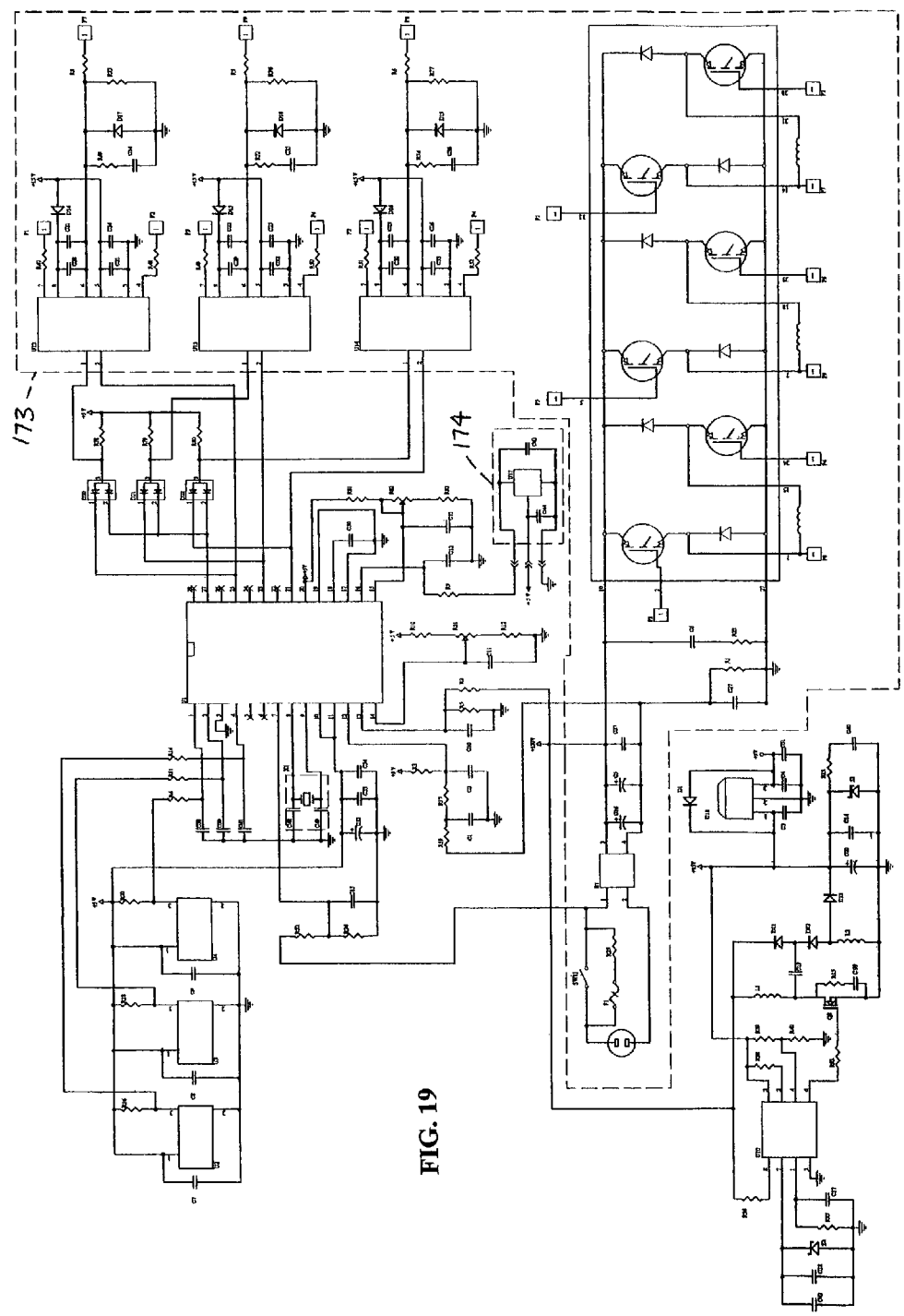
FIG. 19 illustrates a schematic diagram of an electronics package of the electrical device of FIG. 1.

FIG. 19 illustrates a schematic diagram of an electronics package that is utilized to control the operation of the SR motor 10 based on the operator's input using the trigger 124. The electronics package includes a number of low voltage (e.g., a controller and hall effect devices) and a number of high voltage (i.e., power) components. Generally, power components need to be isolated from low voltage components because electrical noise generated by the power components can disrupt the operation of the low voltage components. A technique for reducing the electrical interference caused by the power components is to separate the power components from the low voltage components by enough space on the PCB on which the power components and the low voltage components are mounted such that the degree of electrical interference experienced by the low voltage components does not disrupt the operation of the low voltage components. As discussed above, space considerations of the illustrated electrical device 100 do not allow for such spacing techniques. Accordingly, in one aspect, the invention provides for the use of two PCBs that are stacked, thereby separating the power components from the low voltage components such that the low voltage components operate as intended. The stacked PCBs are shown in FIGS. 15 and 16 which illustrate partial sectional views of the electrical device 100. In other constructions, the components and/or the PCB(s) may be placed alternatively (e.g., some low voltage components placed on a PCB that is perpendicular to a PCB that includes low voltage components and power components), shielding techniques may be utilized to limit the amount of electrical interference received by the low voltage components, and/or other techniques may be utilized to ensure proper operation of the electrical components.

Figure 20:
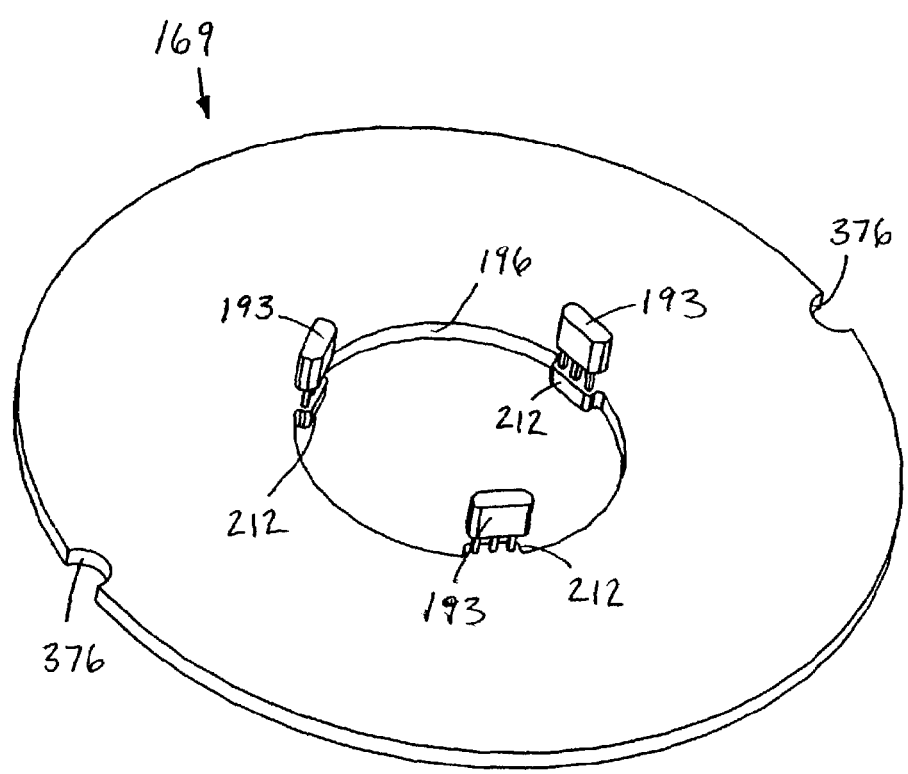
FIG. 20 illustrates a perspective view of a first printed circuit board of the electronics package illustrated in FIG. 19.

FIG. 20 illustrates a perspective view of a first PCB 169 that is utilized primarily for the low voltage components of the electronics package. The first PCB 169 may be screen printed to indicate the location of the components included on the first PCB 169. The first PCB 169 includes a number of position/speed sensors 193. In one construction, the position/speed sensors 193 are hall effect devices. The position/speed sensors 193 interact with the magnet hub 148 to determine the speed and direction in which the shaft 132 is rotating and the position of the rotor poles 22, 26, 30 and 34 with respect to the stator poles 46, 50, 54, 58, 62 and 66, such that the representative phases 1, 2 and 3 of the SR motor 10 can be energized at appropriate times to effectively operate the SR motor 10. Such determinations may be made by the controller in accordance with techniques generally known in the art. In one construction, the first PCB 169 includes an aperture 196. The aperture 196 corresponds to the size of the stepped hub 200 on the rear bell 160 such that the first PCB 169 can rest against the second side 248 of the rear bell 160.

The aperture 196 of the first PCB 169 may include a number of tabs 212 that correspond to notches 216 in the stepped hub 200 of the rear bell 160. The position/speed sensors 193 are located on the tabs 212 such that the radial distance between the magnet hub 148 and the position/speed sensors 193 is minimal. As discussed above, the magnet hub 148 includes a number of magnet poles M. As the shaft 132 rotates, the rotor 14 and the magnet hub 148 rotate at the same speed as the shaft 132. The position/speed sensors 193 sense the magnet poles M as the magnet poles M pass by each position/speed sensor 193. The position/speed sensors 193 generate a signal representative of what is currently being sensed by the position/speed sensor 193 (e.g., the presence of a north and/or south magnet pole M and the strength of the interaction, or the lack of the presence of a magnet pole M). The controller receives the signal and utilizes the data to determine the speed and direction of the shaft 132 rotation, the position of the rotor 14 with respect to the stator 38 and the energizing pattern of the representative electrically independent phases 1, 2 and 3. In alternative constructions, the method of position/speed sensing could vary (e.g., optical sensing, varied placement of the position/speed sensors 193 (e.g., inboard of the magnet poles M instead of outboard of the magnet poles M such that the signal is obtained from an axial surface of the magnet poles M instead of a radial surface), use of surface mount technology, etc).

Figure 21:
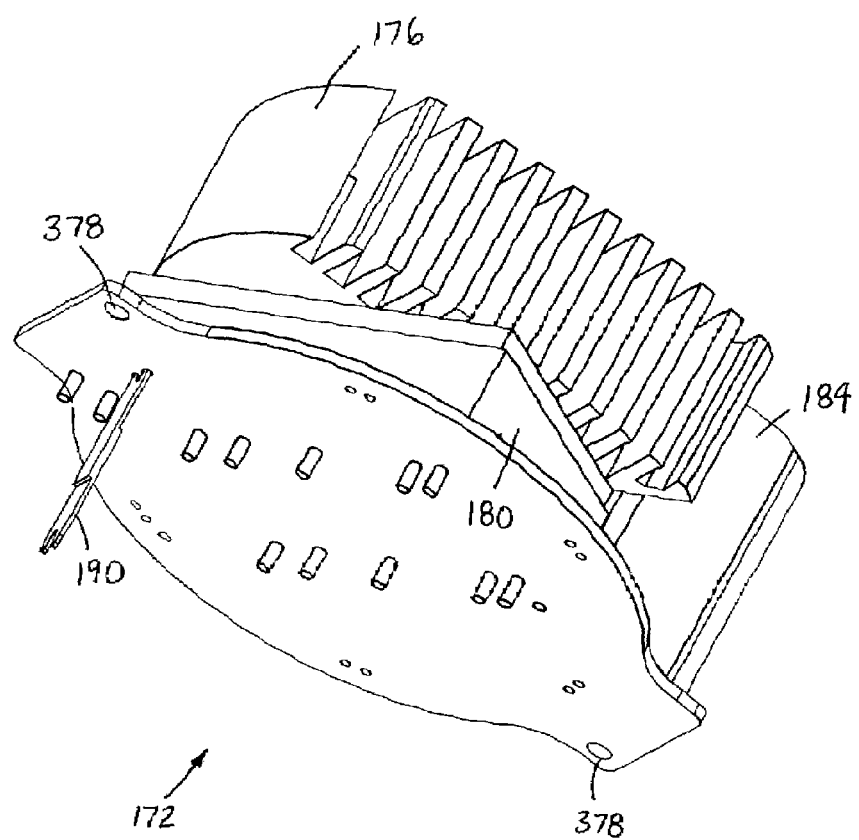
FIG. 21 illustrates a perspective view of a second printed circuit board of the electronics package illustrated in FIG. 19.

FIG. 21 illustrates a perspective view of a second PCB 172 that is utilized primarily for the power components of the electronics package. FIG. 19 includes a section 173 (surrounded by a dashed line). The components in the section 173 generally correspond to the power components, and the components outside of the section 173 generally correspond to the low voltage components. The second PCB 172 may be screen printed in a manner similar to that used on the first PCB 169. The second PCB 172 includes a large heat sink 176, a power box 180 (e.g., power transistors and diodes) and storage capacitors 184. The second PCB 172 further includes a number of connectors (not shown) that electrically connect the second PCB 172 to the first PCB 169. In one construction, the connectors provide signals (e.g., a power signal and a ground) to the low voltage components mounted on the first PCB 169.

The second PCB 172 also includes a number of contacts 190 (only one contact 190 is illustrated in FIG. 21). As discussed above, each of the contacts 190 is designed to removably electrically couple the electronics package of the electrical device 100 to a representative stator winding 70, 74, 78, 82, 86 and 90. The illustrated contacts 190 are male connectors. The corresponding female connectors 191 are located in the terminal blocks 192. When the stator assembly 156 is assembled as discussed below, the electronics package is electrically connected to the stator windings 70, 74, 78, 82, 86 and 90 and the controller can control the operation of the SR motor 10 in accordance with generally known techniques.

In one construction, the second PCB 172 includes one contact 190 for each stator winding, or two contacts for each electrically independent phase. A single conductor is utilized to form the stator windings of the pole pair of stator windings that form an electrically independent phase when the number of contacts 190 equals the number of stator windings. That is, for example, a single conductor is utilized to first form stator winding 74 on stator pole 50 and then stator winding 86 on stator pole 62. A portion of the single conductor forms an input to the electrically independent phase 2 and another portion of the single conductor forms an output to the electrically independent phase 2. One contact 190 is electrically coupled to the input, and a second contact 190 is electrically coupled to the output. The controller can then control the operation of that particular phase.

In another construction, the second PCB 172 may include twice as many contacts 190 as stator windings, or four contacts for each electrically independent phase. A single conductor is utilized to form a single stator winding when the number of contacts 190 equals twice the number of stator windings. Each stator winding of the pole pair of stator windings that form an electrically independent phase includes an input and an output. A first contact 190 is electrically coupled to the input of a first stator winding, a second contact 190 is electrically coupled to the output of the first stator winding, a third contact 190 is electrically coupled to the input of a second stator winding and a fourth contact 190 is electrically coupled to the output of the second stator winding. The second and third contacts 190 are electrically coupled to one another via the electronics package to form an electrically independent phase. The controller can then control the operation of that particular phase.

In an alternative construction of the stator assembly 156, a terminal plate 164 may be provided on each side of the stator 38 or on the side of the stator 38 opposite to that of the illustrated construction. Techniques in accordance with those discussed above may then be utilized to form the electrically independent phases of the SR motor 10.

It should be understood that the present invention is capable of use with other PCB configurations and that the first PCB 169 and the second PCB 172 are merely shown and described as an example of one such PCB configuration. The illustrated PCB configuration includes two double-sided single-layer PCBs.

For example, as is further illustrated in FIG. 19, the electrical device 100 may include a third small PCB (not shown) that includes the components in a section 174 (surrounded by a dashed line). The components in section 174 may be utilized to determine a temperature at a location inside the electrical device 100 (e.g., near the electronics mounted on the heat sink 176) and may be utilized as part of the heat dissipation techniques discussed below in more detail. In one construction, if the temperature inside the electrical device 100 exceeds a threshold level, the power provided to the electrical device 100 may be automatically limited to ensure the operational parts of the electrical device 100 are not adversely affected by the high temperature.

In one construction, the controller of the electronics package is implemented in a programmable device. The controller may operate through the use of a number of inputs. For example, the controller may receive position and speed data from the position/speed sensors 193 from which the motor speed is computed. The controller may also receive input from one or more devices (e.g., the trigger 124) which indicate the desired speed of operation as well as the desired direction of rotation (if applicable). Based on the sensed speed and direction and the requested speed and direction, the controller outputs the proper commutation sequence in order to drive the SR motor 10 at the desired speed and direction of rotation. The controller may also receive information regarding the current in the SR motor 10 which can be used to monitor the current for a current overload condition. If such a condition exists, the controller outputs a reduced commutation sequence to limit the current in the windings. The controller may also receive temperature data that is utilized to monitor the temperature of monitored components (e.g. the heat sink 176, the stator 38, etc.) for a high temperature condition. If such a condition exists, the controller may output a shutdown command (or alternatively slow the speed of operation) to limit damage to the components of the electrical device 100.

Heat Dissipation

Heat generated by the electrical device 100 includes heat generated by the electrical components and heat generated by the stator windings. Heat that is generated needs to be dissipated for efficient operation of the SR motor 10. Typically, active dissipation techniques are more advantageous than passive dissipation techniques.

Power components commonly generate more heat than low voltage components. The heat sink 176 discussed above assists in dissipating heat generated by the power components through passive techniques. The effectiveness of the heat sink 176 can be greatly increased by propelling air across the fins of the heat sink 176 to produce active dissipation. Similarly, components of the SR motor 10 that include windings typically generate much more heat than components that do not include windings. Although the rotor 14 does not include windings, the stator 38 does. The stator 38 therefore adds to the heat generated by the electrical device 100. This heat must also be dissipated for efficient operation of the electrical device 100. Again, active dissipation is more effective than passive dissipation.

Accordingly, in one aspect, the invention includes a method and apparatus for propelling cooling air through the electrical device 100 such that heat is actively dissipated. FIGS. 1 and 15 illustrate air intake vents 360 in the control housing 104 of the electrical device 100. As the shaft 132 rotates, the fan 144 coupled to the shaft 132 rotates and pulls fresh air through the air intake vents 360. Air entering the air intake vents 360 is cool and can be utilized for the cooling process. Air inside the electrical device 100 is encouraged to continue to travel toward the fan 144. The air that enters the air intake vents 360 is directed either radially toward the geometry of the heat sink 176 or axially toward the SR motor 10.

The rear bell 160 axially seals the electronics package from the SR motor 10 and, therefore, air that travels across the heat sink 176 is only allowed to travel radially away from the heat sink 176. As the air travels radially away from the heat sink 176 it encounters an inside surface of the control housing 104 and is directed axially toward the SR motor 10.

Figure 22:
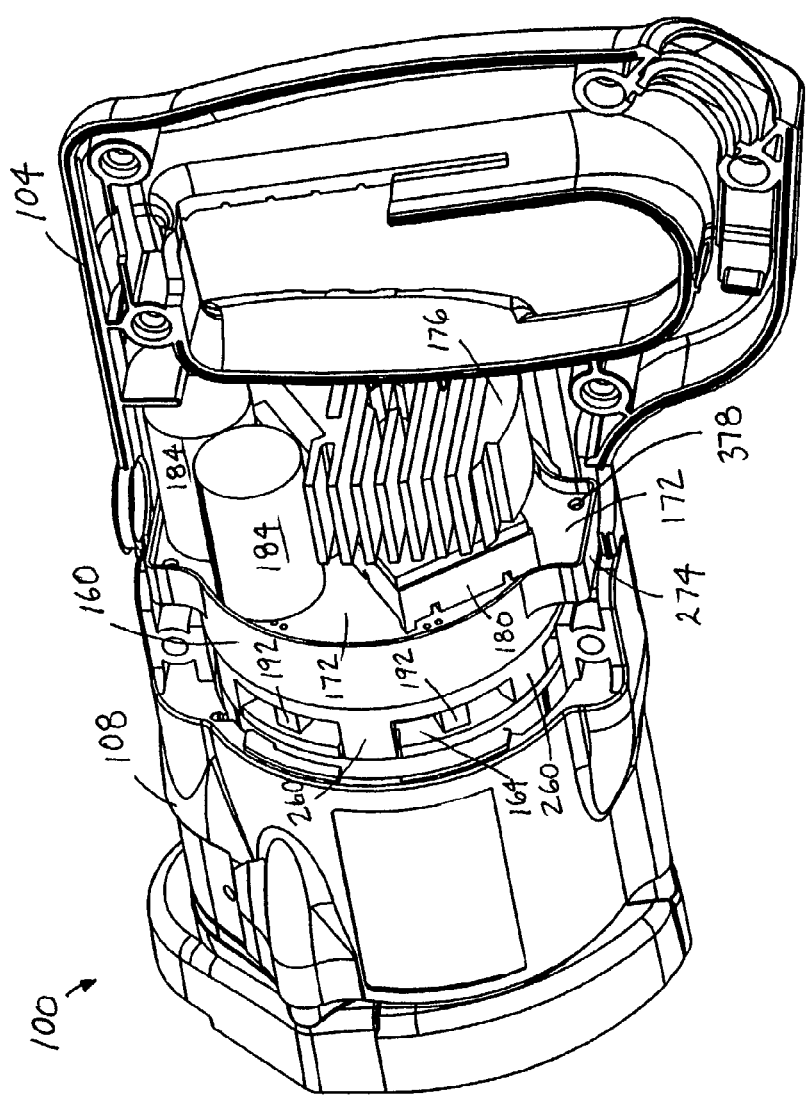
FIGS. 22 and 23 illustrate partial assemblies of the electrical device illustrated in FIG. 1.
Figure 23:
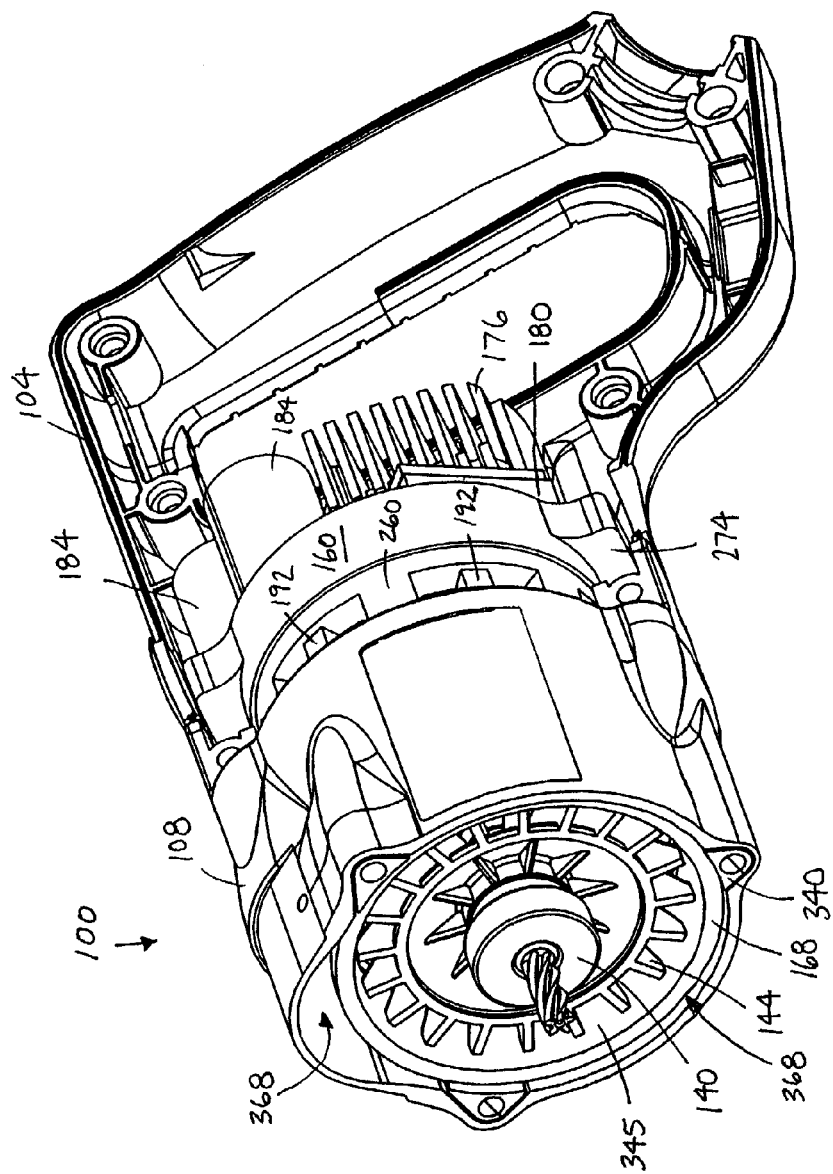

Air traveling axially toward the SR motor 10 travels between the circumferentially annular wall 272 and an inside surface of the control unit housing 104. This air can continue to travel down the inside of the housing between the outside of the stator 38 and an inside surface of the drive unit housing 108 or, alternatively, this air can travel radially inward through gaps between the spacer blocks 260. FIGS. 22 and 23 further illustrate the spaces through which the air can travel. The spacer blocks 260 are configured such that air can travel between the spacer blocks 260 and then axially towards the stator windings. Air travelling axially towards the stator windings travels across the stator windings thereby cooling the stator windings. The air then continues to move axially towards the fan 144.

Air traveling between the inside surface of the drive unit housing 108 and the stator 38 cools the outside of the stator 38. As the air approaches the air inlet vents 322, the air turns radially inward and travels through the air inlet vents 322 and toward the fan 144. The heated air is then propelled through the fan and out an air outlet vent 364 (FIG. 1). The air outlet vent 364 vents heated air to the outside of the electrical device 100. As illustrated in FIG. 1, the air outlet vent is at the junction of the drive unit housing 104 and the driven unit housing 108. Air is allowed to reach the air outlet vent 364 through gaps 368 created between the front bell 168 and the drive unit housing 108. The front bell 168 is positioned adjacent the driven unit housing 112 at tabs 340, but as illustrated in FIG. 23, the gaps 368 allow the heated air to reach the air outlet vent 364. When the shaft 132 is rotating (i.e., when the electrical device 100 is operating and therefore generating heat), cool air is continually pulled in through the air intake vents 360 and heated air is continually pushed out of the air outlet vents 364. In one construction, the fan 144 is a mixed flow fan that allows for axial and radial flow. In alternative constructions, an axial flow fan or a radial flow fan may be utilized. In alternative constructions, the air passages may be altered to allow for an efficient cooling process.

Tolerance Stack-Up

Manufacturing of a SR motor generally requires that the air gap between the stator 38 and the rotor 14 is small enough that the stator poles 46, 50, 54, 58, 62 and 66 and the rotor poles 22, 26, 30, and 34 are allowed to interact for efficient operation of the SR motor 10. Larger air gaps can generally be utilized for efficient operation of the other types of drive units commonly utilized in hand-held power tools. Therefore, the tolerance requirements for an efficient SR motor are generally much tighter than the tolerance requirements for an efficient other type of drive unit (e.g., a universal motor). Despite the potential benefits available through the use of the SR motor 10 as the drive unit for a hand-held power tool, the labor costs associated with producing the SR motor 10 for use in the electrical device 100 are inhibitive when accomplished in accordance with general power tool construction techniques (i.e., with the high tolerance requirements). Accordingly, in one aspect, the invention provides a construction of the electrical device 100 that reduces tolerance "stack-up" as is generally produced during power tool assembly in accordance with general power tool construction techniques. Tolerance stack-up typically does not result in power tool operation problems when the power tool being assembled incorporates a drive unit other than a SR motor because of the use of a larger air gap.

General power tool construction techniques include coupling the rotor of the drive unit to the gearbox of the driven unit and coupling the stator of the drive unit to the housing of the power tool. The invention incorporates a reduced tolerance stack-up design though the elimination of a number of the levels of tolerance. For example, the stator assembly 156 is not coupled to any portion of the housing (e.g., the control housing 104, the drive unit housing 108 and/or the driven unit housing 112) for the purpose of aligning the stator assembly 156. The stator assembly 156 is only positioned inside the housing of the electrical device 100 for the purpose of protecting the internal workings of the electrical device 100. One end of the rotor assembly 130 is aligned with respect to the stator assembly 156 such that the rotor 14 and the stator 38 are allowed to interact for efficient operation of the SR motor 10.

The rotor assembly 130 is assembled as discussed above. The stator assembly 156 is assembled according to the following process. The stator 38 including the terminal plate 164 is positioned between the front bell 168 and the rear bell 160. The terminal plate 164 is positioned such that pin members 308*b* and 308*e* are received by apertures 240*b* and 240*e* of the stator 38 and the cutouts 304*a* and 304*d* including the recesses 305*a* and 305*d*, respectively, are aligned with the corresponding apertures 240*a* and 240*d* on the stator 38. The rear bell 160 is positioned on the side of the stator 38 including the terminal plate 164. The spacer blocks 260 of the rear bell 160 are positioned such that the pin members 268*c* and 268*f* of spacer blocks 260*c* and 260*f* are received by apertures 240*c* and 240*f* of the stator 38 and the apertures 266*a* and 266*d* of spacer blocks 260*a* and 260*d* are aligned with the corresponding apertures 240*a* and 240*d* on the stator 38. When the terminal plate 164 and the rear bell 160 are aligned in such a manner, the spacer blocks 260*b* and 260*e* rest flush against the terminal plate 164 on the first side 292 of the terminal plate 164 opposite the pin members 308*b* and 308*e*, spacer blocks 260*a*, 260*c*, 260*d* and 260*f* rest flush against the stator 38 and the second side 296 of the terminal plate 164 rests flush against the stator 38. In one construction, the spacer blocks 260*b* and 260*e* actually do not rest flush on the terminal plate 164 but float with respect to the terminal plate 164 such that no tolerance stack-up is added due to the terminal plate 164. The spacer blocks 260*b* and 260*e* may be a fraction of an inch (e.g., 0.004 inches) smaller than the gap they are utilized to fill to achieve this float. Inclusion of the cutouts 304*a*, 304*c*, 304*d* and 304*f* on the terminal plate 164 and the reduced height profile of spacer blocks 260*b* and 260*e* results in no tolerance stack-up attributable to the terminal plate. The positioner portion 320*p* of the circumferentially annular wall 320 is positioned radially outward of the stator 38. Such placement positions the annular region 324 adjacent to the stator 38. The apertures 329*a* and 329*b* are aligned with the corresponding apertures 240*a* and 240*d* on the stator 38. As illustrated in FIG. 12, two bolt members 372*a* and 372*b* are positioned through the apertures 329*a* and 329*b* of the front bell 168, through the apertures 240*a* and 240*d* of the stator 38, through the cutouts 304*a* and 304*d* (including the recess 305*a* and 305*d*) of the terminal plate 164 and into the apertures 266*a* and 266*d* of the rear bell 160 wherein the bolt members 372*a* and 372*d* are terminated. As the bolt members 372*a* and 372*d* are fastened, the components of the stator assembly 156 are frictionally engaged with one another. The fan baffle 308 is placed in the front bell 168 resulting in an assembled stator assembly 156 (e.g., the stator assembly illustrated in FIG. 12). In one construction, the bolt members 372*a* and 372*b* are threaded into the apertures 266*a* and 266*d*. In alternative constructions, the stator assembly 156 may be held together with other types of fasteners.

After the stator assembly 156 has been assembled, the rotor assembly 130 is coupled to the stator assembly 156 by pressing the end of the shaft 132 including the magnet hub 148 and the first bearing 136 into the stepped hub 200. In one construction, a tolerance ring is placed radially adjacent and outward of the first bearing 136 in the bearing pocket 208. The tolerance ring is utilized in one aspect to compensate for any thermal expansion of the rear bell 160. The other end of the rotor assembly 130 is then coupled to the driven unit housed in the driven unit housing 112. The combination of the rotor assembly 130 and the stator assembly 156 is positioned in the housing of the electrical device 100. Tabs 340 and apertures 344 are utilized to position the combination in the drive unit housing 108 and the driven unit housing 112.

The electronics package is then inserted as discussed below. After the electronics package is inserted, the remaining portions of the housing are assembled and the electrical device 100 is readied for use.

The method and apparatus for assembling the electrical device 100 reduces tolerance stack-up such that the rotor 14 and the stator 38 interact for efficient operation of the SR motor 10. Additionally, the method and apparatus for assembling the electrical device 100 are accomplished with labor costs that are competitive in the market. These techniques may be useful in any electrical device 100 that utilizes a SR motor 10.

Self-Contained Electronics Package

The electrical device 100 includes an electronics package that is releasably engaged by the remaining components of the stator assembly 156. Such a construction is advantageous for assembly and future replacement of the electronics package. The characteristics of the SR motor 10 may necessitate replacement of the electronics package at some time. The electronics package may be replaced because of failure of all or a portion thereof of the electronics package and/or to provide enhanced motor operation through use of an improved electronics package (e.g., new software for position/speed sensing). The housing can be removed and the electronics package unengaged from the terminal blocks 192 simply by removing a number of fasteners. A replacement electronics package can then be quickly engaged by the terminal blocks 192 and the housing reassembled. This configuration may also be advantageous in applications of SR motors outside hand-held power tools.

The first PCB 169 is coupled to the rear bell 160 through the use of two fasteners (not shown). The fasteners are inserted past two cutouts 376 in the first PCB 169 and into the apertures 265 wherein the fasteners terminate. In one construction, the fasteners are threaded into the apertures 265. In alternative constructions, the first PCB 169 may be coupled to the rear bell 160 using other methods. The second PCB 172 is then electrically coupled to the first PCB 169 via the connectors that deliver the signals such as power and ground, and via the contacts 190 that engage the female connectors 191 of the terminal blocks 192. The second PCB 172 is coupled to the rear bell 160 through the use of two fasteners (not shown). The fasteners are inserted through two apertures 378 in the second PCB 172 and into the apertures 276. In one construction, the apertures 378 have a round shaped cross-section corresponding to the round shaped cross-section of apertures 276. In one construction, the fasteners are threaded into the apertures 276. In alternative constructions, the second PCB 172 may be coupled to the rear bell 160 using other methods. Once the first PCB 169 and the second PCB 172 are coupled to the rear bell 160, the rest of the electrical device 100 can be assembled and readied for operation.

Magnet Encapsulation

Encapsulation of the magnet hub 148 is advantageous because the magnet hub 148 is therefore not in an environment that may include foreign particles such as metal shavings, and the like, that could become magnetically or otherwise coupled to the magnet poles M of the magnet hub 148. Foreign particles such as metal shavings and dirt may interfere with the accuracy of determinations of the speed at which the shaft 132 is rotating, the direction in which the shaft 132 is rotating and the position of the rotor 14 with respect to the stator 38.

As discussed above, the magnet hub 148 is encapsulated when the stator assembly 156 and the rotor assembly 130 are combined. When the stator assembly 156 and the rotor assembly 130 are combined, the magnet hub 148 is placed in the magnet pocket 204 and the first bearing 136 is seated in the bearing pocket 208. The shaft 132 is thereby allowed to rotate about the axis 18 via the first bearing 136 (and the second bearing 140) while the outside surface of the first bearing 136 remains frictionally engaged with the bearing pocket 208. The magnet hub 148 rotates with the shaft 132 in the magnet pocket 204 and is used to determine speed and direction of the SR motor 10 as discussed above.

Magnet Alignment

The positioning of the magnet poles M with respect to the rotor poles 22, 26, 30 and 34 which the magnet poles M are intended to represent is important when the interactions between the magnet poles M and the position/speed sensors 193 are used to determine the position of the rotor poles 22, 26, 30 and 34 with respect to the stator poles 46, 50, 54, 58, 62 and 66. The positioning of the magnet poles M is important for determining position of the rotor 12 with respect to the stator 38 because the process of energizing each of the electrically independent phases 1, 2, and 3 at the appropriate time is needed for efficient operation of the SR motor 10. Accordingly, since the interactions between the magnet poles M and the position/speed sensors 193 are utilized for, among other things, position sensing, the invention provides an apparatus and a method for aligning the magnet poles M with respect to the rotor poles 22, 26, 30 and 34 the magnet poles M represent. The positioning of the magnet poles M with respect to the rotor poles 22, 26, 30 and 34 which the magnet poles M represent is not particularly important when the interactions between the magnet poles M and the position/speed sensors 193 are used only to determine the speed at which and/or the direction in which the shaft 132 is rotating.

Figure 24:
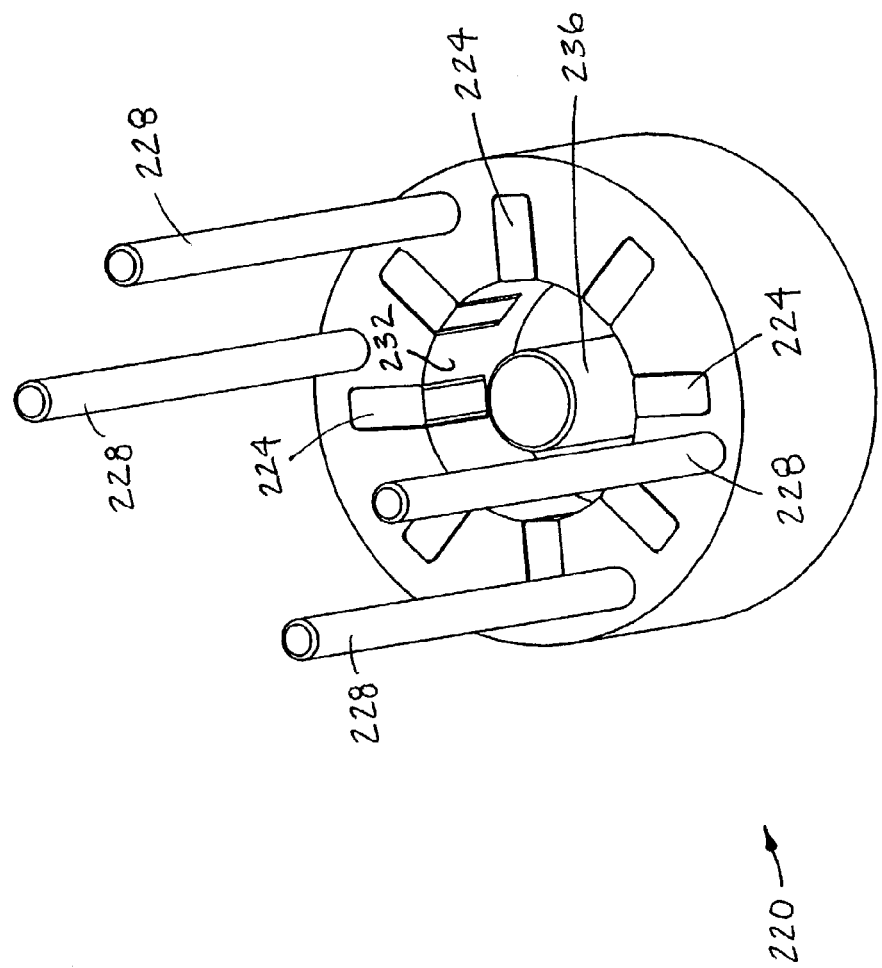
FIG. 24 illustrates a fixture for coupling a magnet hub to a rotor assembly.

FIG. 24 illustrates a fixture 220 for aligning the magnet poles M with respect to the rotor poles 22, 26, 30 and 34 which the magnet poles M represent. The fixture 220 includes a number of magnets 224. The magnets 224 are preferably spaced in accordance with the spacing of the rotor poles 22, 26, 30 and 34 (e.g., evenly spaced about the axis 18). In alternative constructions of the rotor 14, the fixture 220 would preferably be correspondingly altered. The magnets 224 are orientated such that the magnet poles M of the magnet hub 148 are attracted to the magnets 224 when the magnet hub 148 is inserted in the fixture 220 (i.e., north poles of magnet hub 148 are attracted to south poles of magnets 224 and south poles of magnet hub 148 are attracted to north poles of magnets 224). The fixture 220 includes a number of pole members 228. The pole members 228 accept two diametrically opposite rotor poles (e.g., rotor poles 22 and 30). In one construction, the magnets 224 are circumferentially aligned with respect to the pole members 228 such that the magnet poles M on the magnet hub 148 are aligned with respect to the magnets 224 such that the position of each magnet poles M is known with respect to a leading edge or a trailing edge of the rotor pole which the corresponding magnet pole M represents. When the position of the magnet pole M being sensed is correlated to a position on the rotor pole which the magnet pole M represents, the controller can determine the optimum time to energize each of the electrically independent phases 1, 2 and 3.

To align the magnet poles M of the magnet hub 148 with respect to the rotor poles 22, 26, 30 and 34 the magnet poles M represent, the magnet hub 148 is first placed in a recess 232 of the fixture 220. In one construction, the magnet hub 148 is placed in the recess 232 such that the magnet portion of the magnet hub 148 (see FIG. 10) is facing downward in the recess 232. The recess 232 includes a spring biased member 236. The spring biased member 236 supports the magnet hub 148 such that the magnet poles M align with respect to the magnets 224 thereby rotating the magnet hub 148. In one construction, all of the magnet poles M are identically sized and the magnet hub 148 can be initially positioned in any orientation as discussed above. Once the magnet poles M of the magnet hub 148 have reached equilibrium, a partially assembled rotor assembly 130 (e.g., the rotor assembly 130 illustrated in FIG. 6) is inserted into the fixture 220 such that the first bearing 136 side of the shaft 132 is facing downward in the fixture 220. The end of the shaft 132 is inserted into the aperture 232 of the magnet hub 148 and the partially assembled rotor assembly 130 is forcibly pushed downward in the fixture 220. The spring biased member 236 retracts in response to the force and the magnet hub 148 is coupled to the end of the shaft 132. The rotor assembly 130 (e.g., the rotor assembly 130 illustrated in FIG. 7) can then be used to assemble the electrical device 100 as discussed above.

Alternate Constructions

FIGS. 25, 26, 27, 28, and 29 illustrate an alternate construction of a portion of the electrical device 100. The alternate construction includes an electronics module (not shown) that is coupled to the electrical device 100 by at least one lead or connector.

Figure 25:
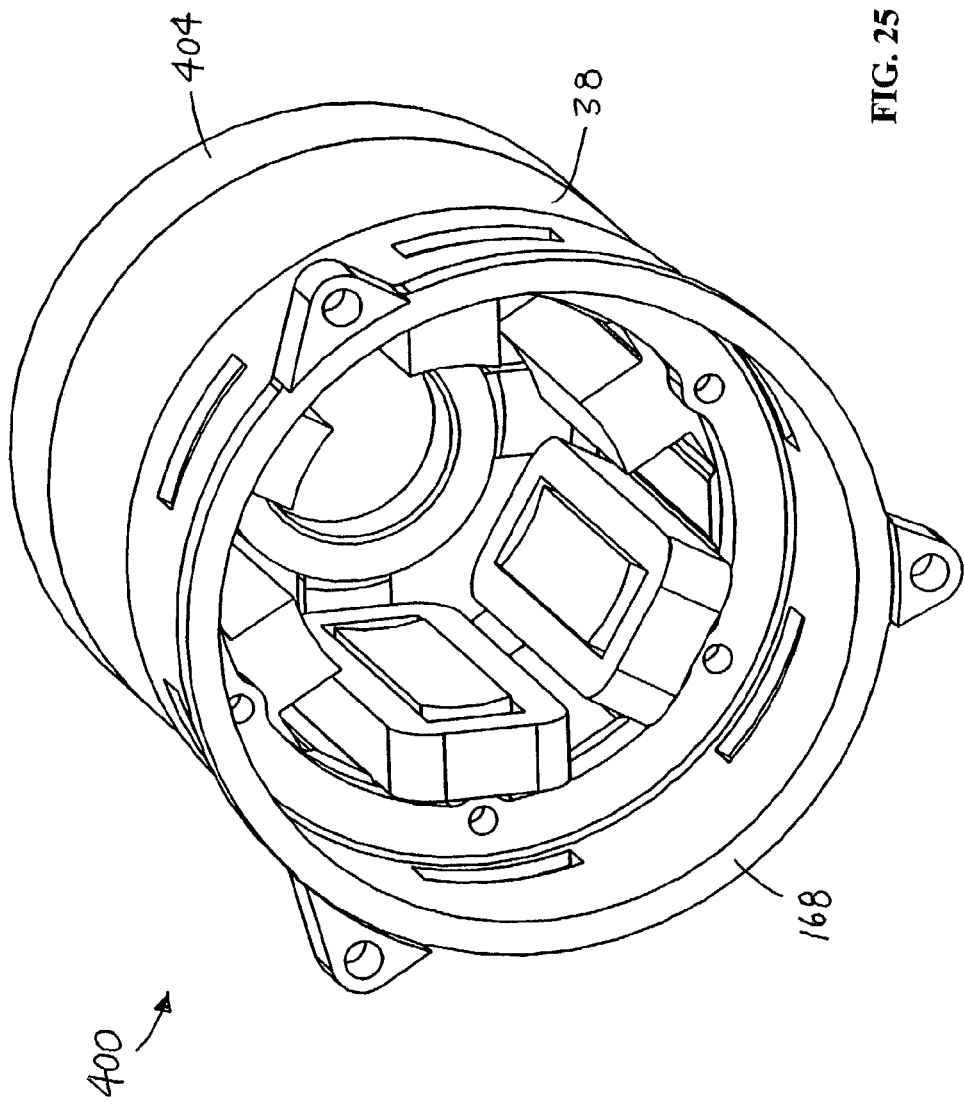
FIGS. 25, 26, 27, 28, and 29 illustrate an alternate construction of a portion of the electrical device illustrated in FIG. 1
Figure 26:
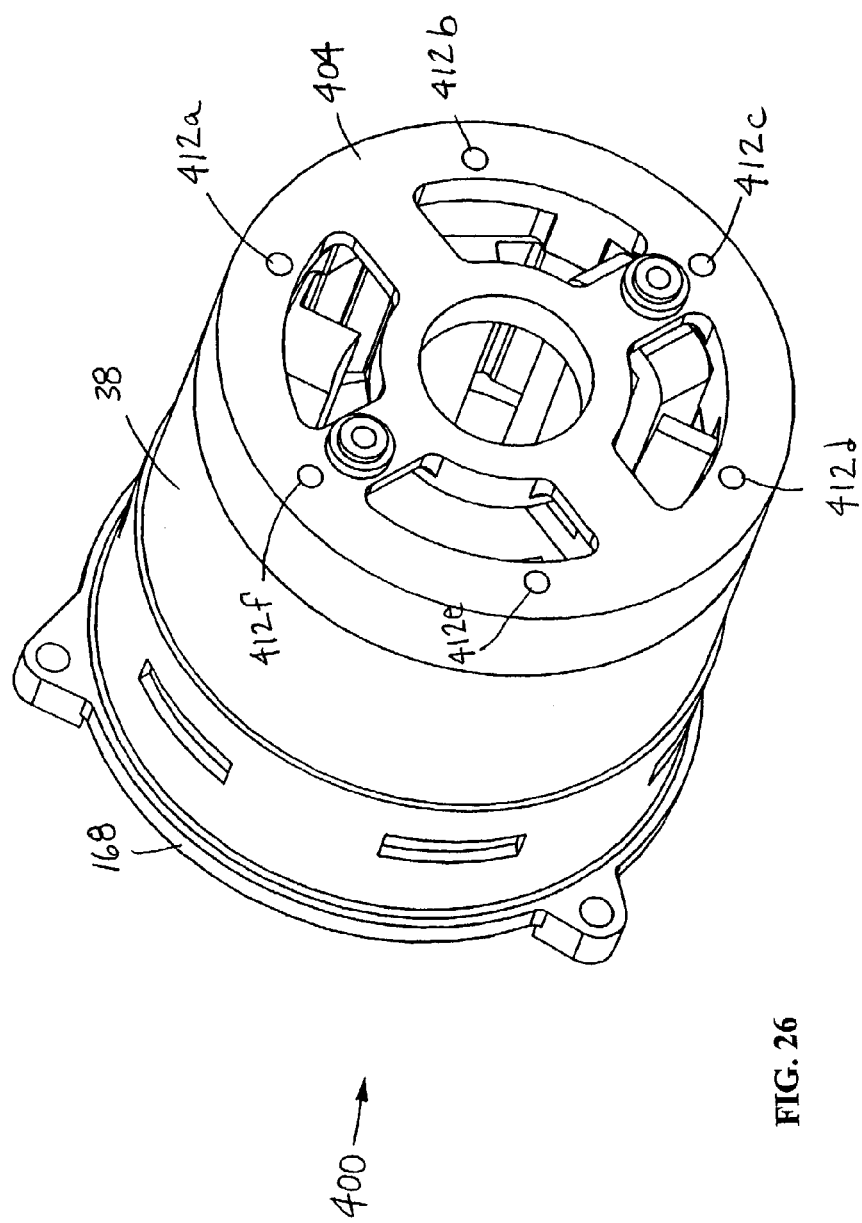

FIGS. 25 and 26 illustrate a stator assembly 400 that is similar to the stator assembly 156 except that the stator assembly 400 does not include the terminal board 164 or the rear bell 160. The stator assembly 400 instead includes a rear structure 404 that supports the bearing 136 of the rotor assembly 130. The magnet hub 148 is allowed to rotate in a fashion similar to that of the construction discussed above.

Figure 27:
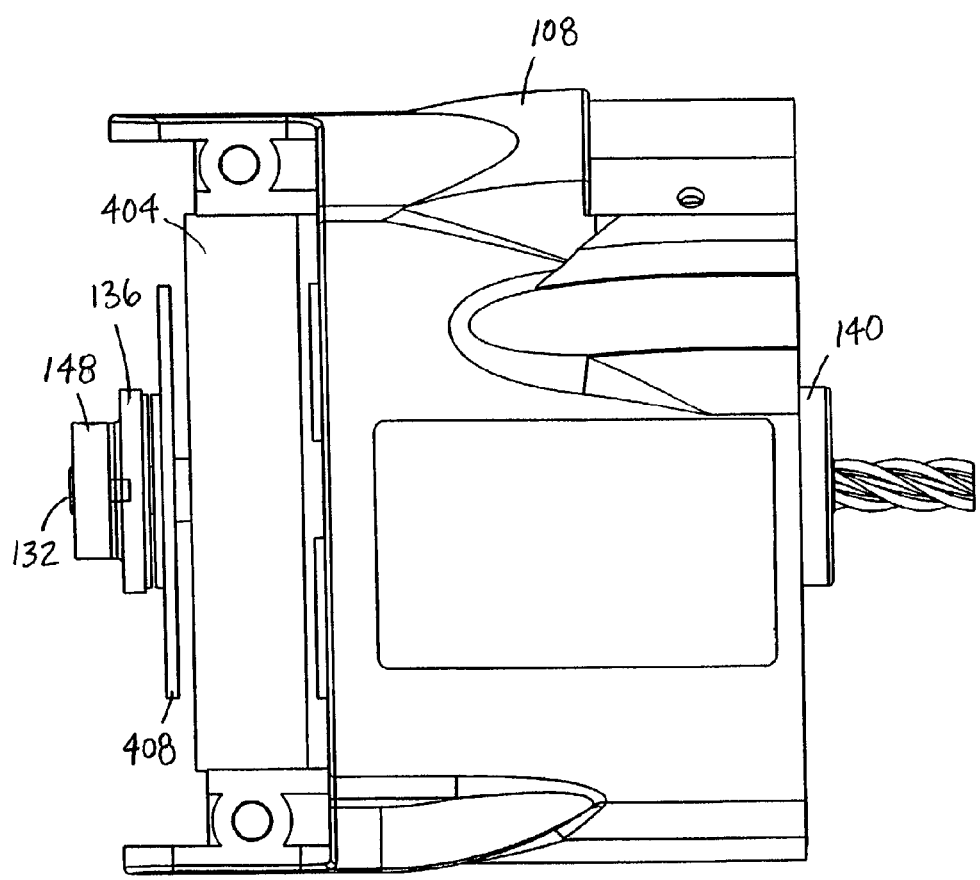
Figure 28:
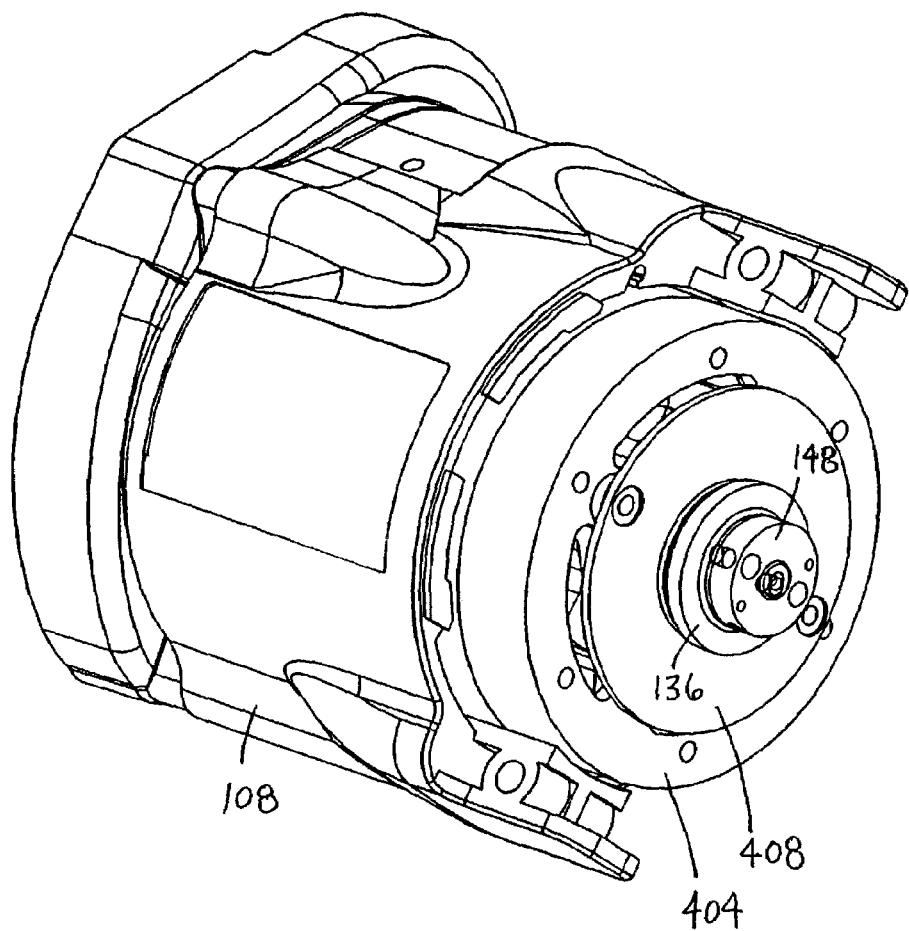
Figure 29:
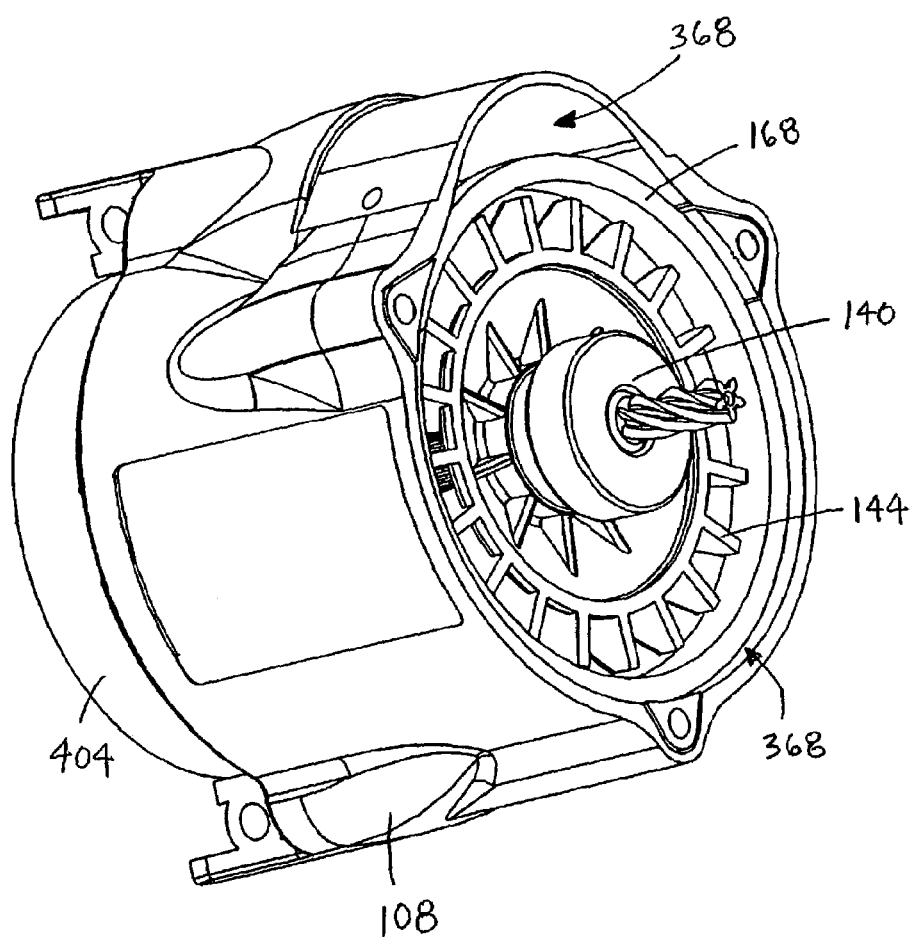

FIGS. 27, 28, and 29 illustrate partial assemblies of the alternate construction. A PCB 408 is coupled to the rear structure 404. The PCB 408 includes position/speed sensors that interact with the magnet poles of the magnet hub 148 as discussed above. The rear structure 404 includes a number of apertures 412a–f that correspond to the apertures 240a–f.

FIGS. 30, 31, 32, 33, 34, 35, 36, 37, and 38 illustrate an alternative construction of an electrical device 1000. In the illustrated alternative construction, the electrical device 1000 is a circular saw. The electrical device 100 and the electrical device 1000 are substantially identical with respect to the disclosed aspects. Common components of the electrical device 100 are indicated by the same reference numerals in the one-thousand series. Although the electrical device 100 and the electrical device 1000 have an obviously different appearance, the integration of the SR motor of the electrical device 1000 and the electronics package utilized to operate the SR motor of the electrical device 1000 is almost identical to the integration of SR motor 10 and the electronics package utilized to operate the SR motor 10. The component parts of the rotor assembly 1130 and the stator assembly 1156 may vary in shape and size, but the function is similar to that discussed above with respect to the rotor assembly 130 and the stator assembly 156.

Figure 30:
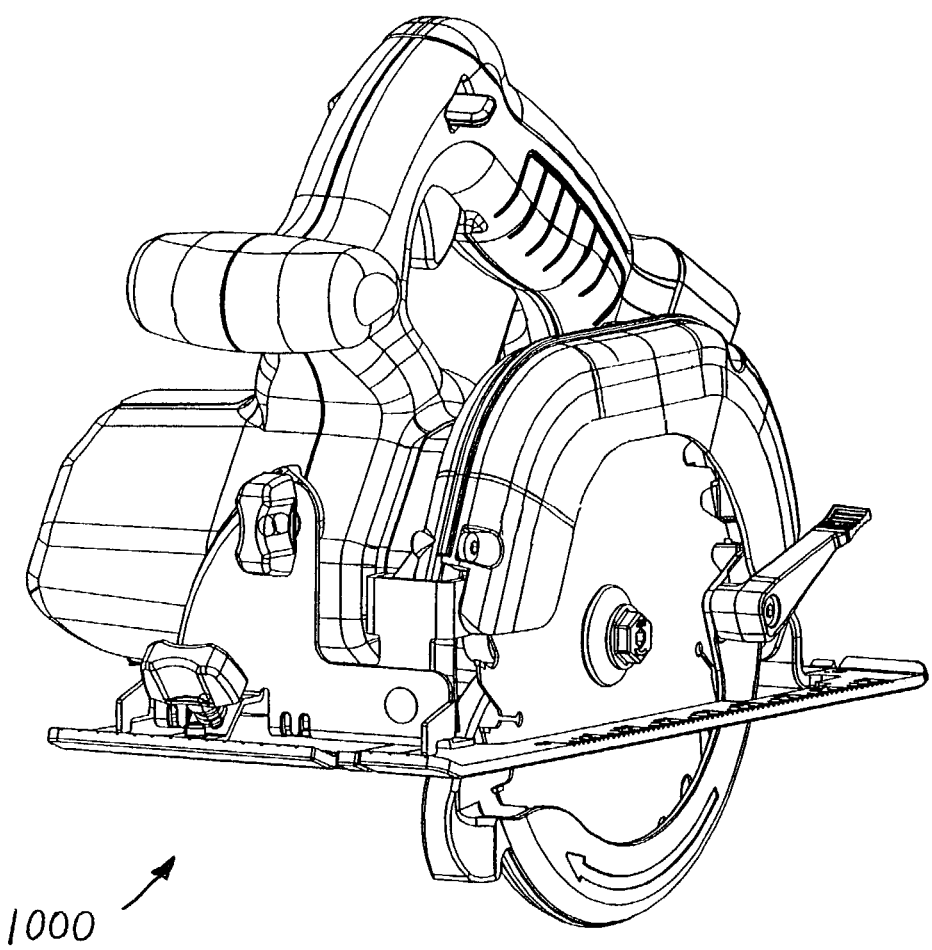
FIG. 30 is a perspective view of an electrical device embodying the invention.
Figure 31:
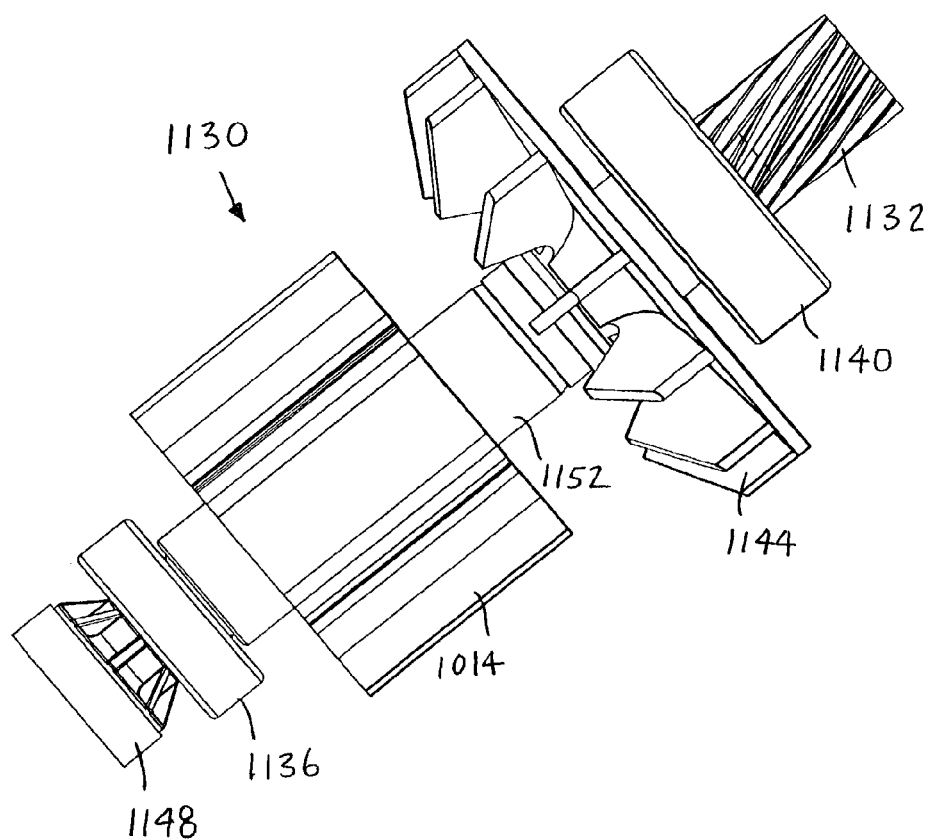
FIGS. 31 and 32 illustrate perspective views of a rotor assembly of the electrical device illustrated in FIG. 30.
Figure 32:
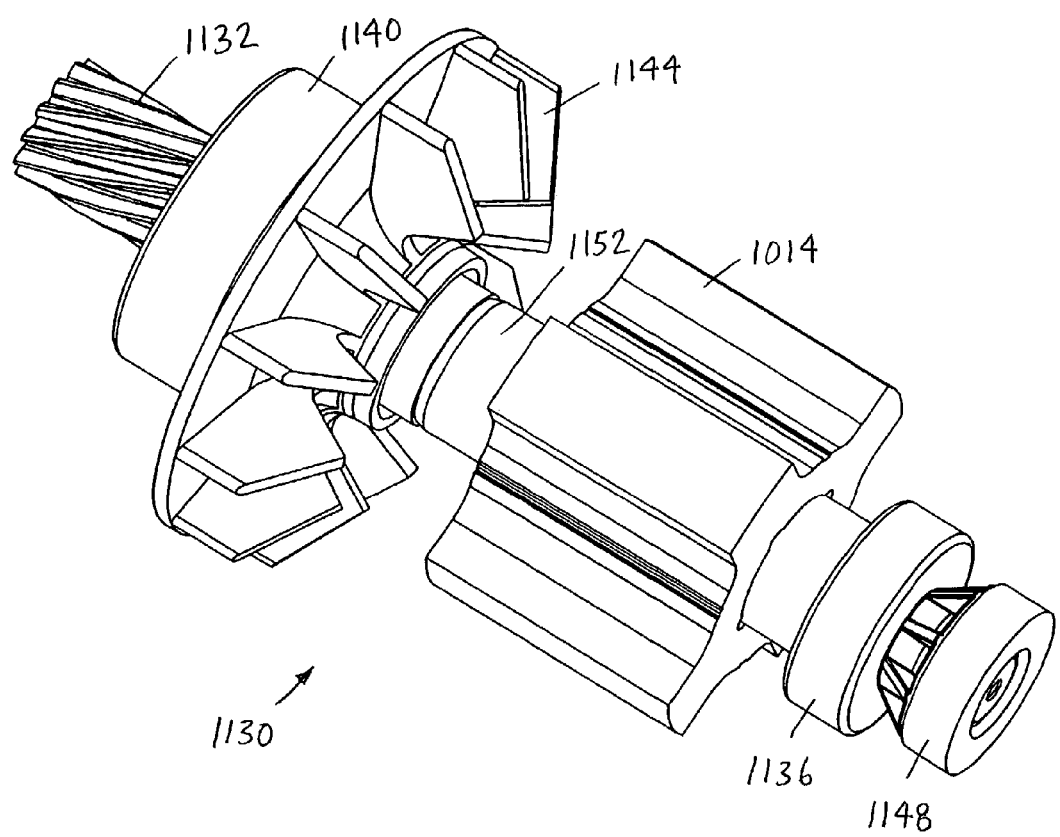
Figure 33:
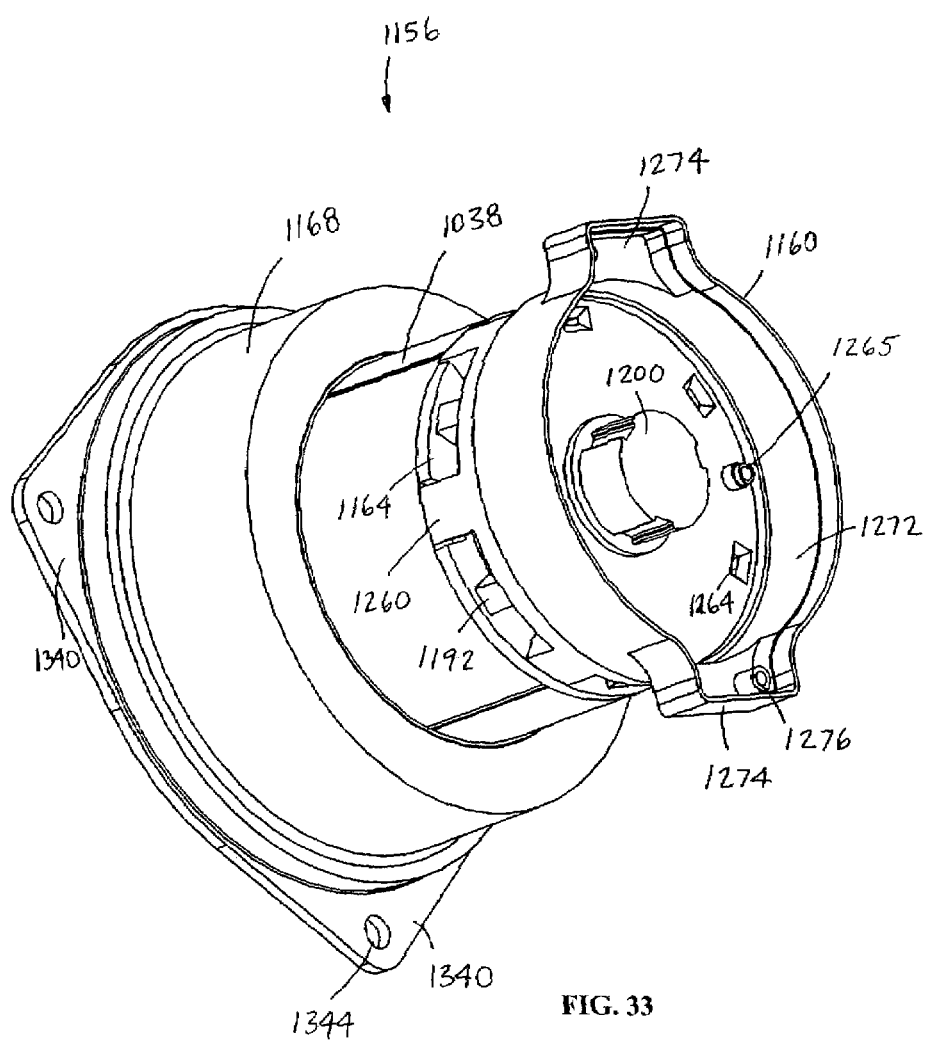
FIGS. 33 and 34 illustrates perspective views of a stator assembly of the electrical device illustrated in FIG. 30.
Figure 34:
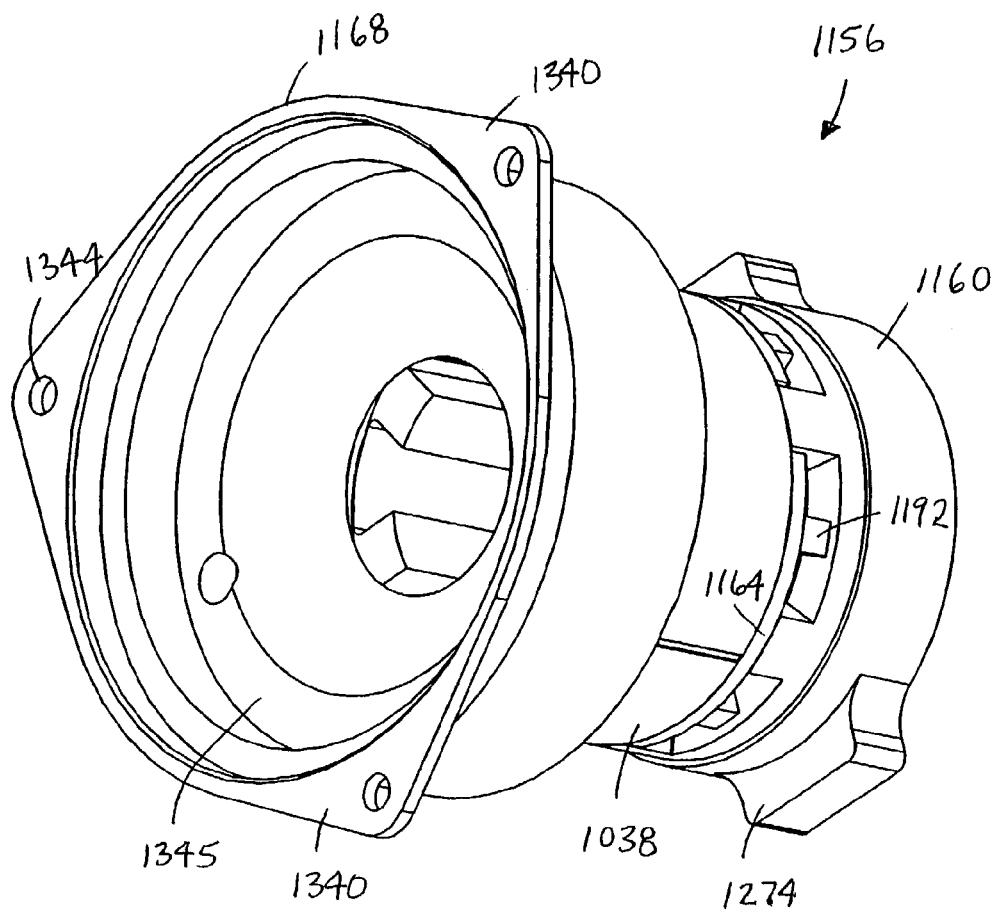
Figure 35:
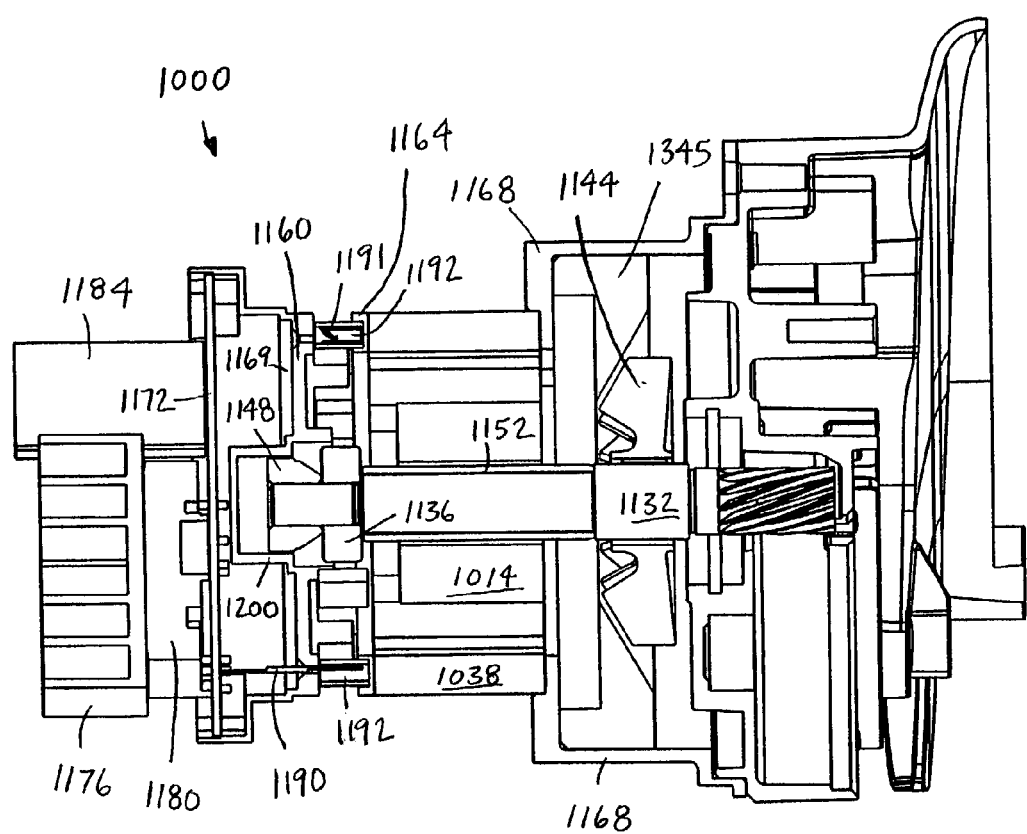
FIG. 35 illustrates a partial sectional view of the electrical device illustrated in FIG. 30.
Figure 36:
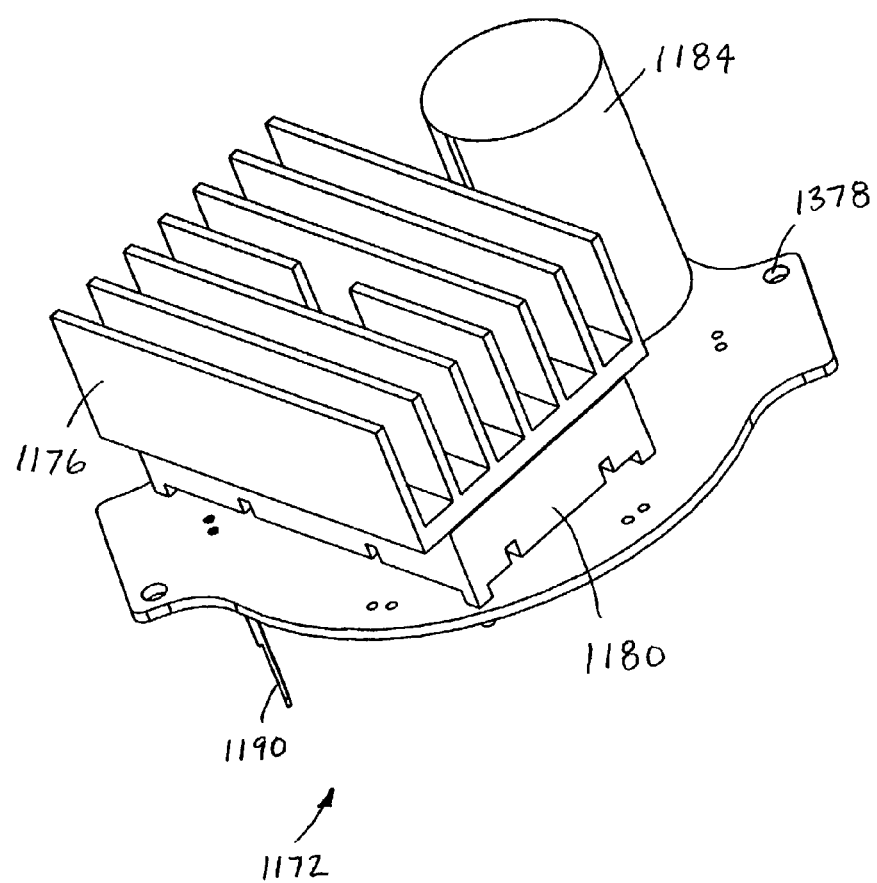
FIG. 36 illustrates a perspective view of a printed circuit board of the electrical device illustrated in FIG. 30.
Figure 37:
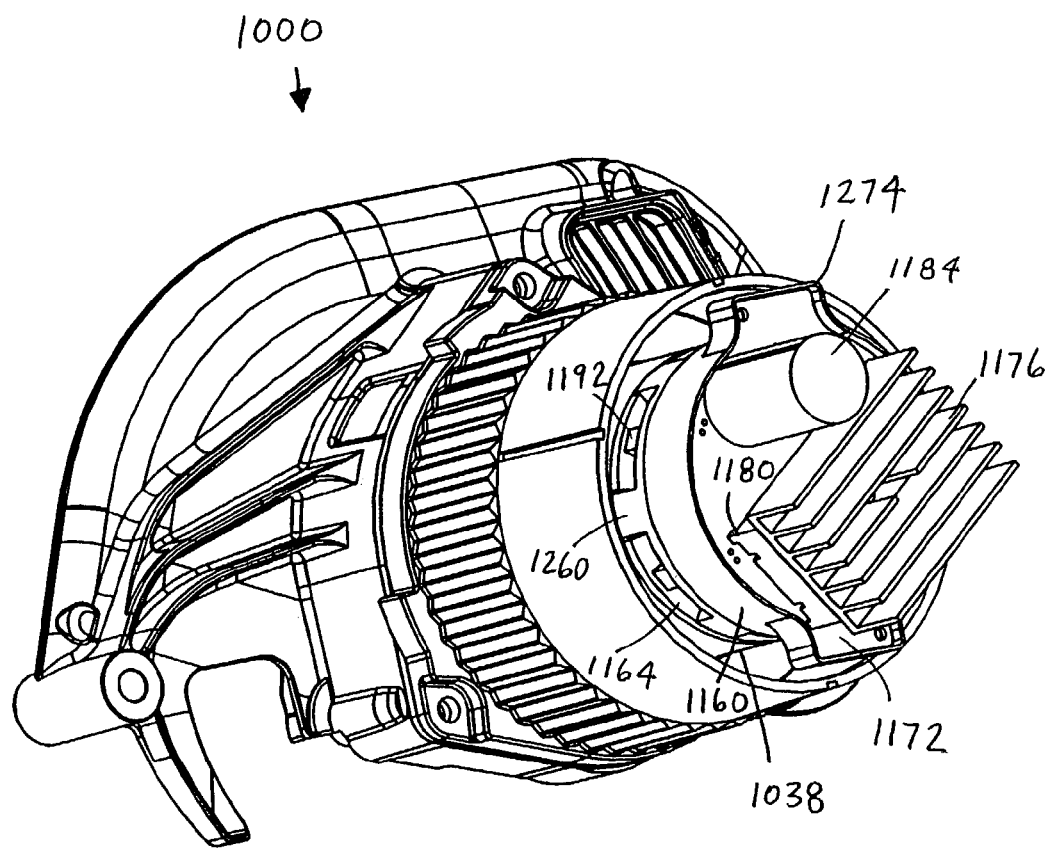
FIGS. 37 and 38 illustrate partial assemblies of the electrical device illustrated in FIG. 30.
Figure 38:
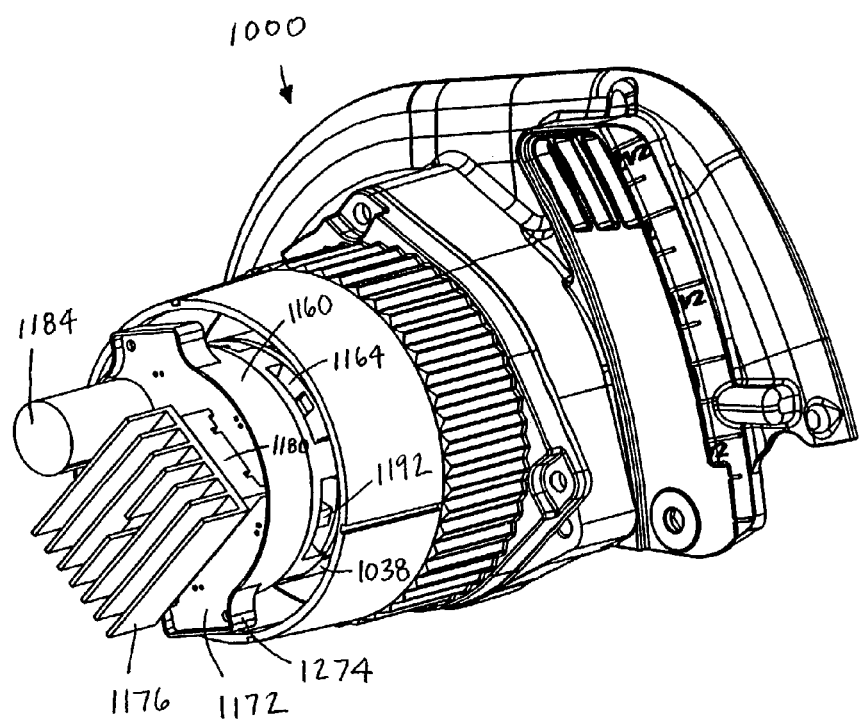

FIG. 30 illustrates a perspective view of the electrical device 1000. FIGS. 31 and 32 illustrate perspective views of the rotor assembly 1130. FIGS. 33 and 34 illustrate perspective views of the stator assembly 1156. FIG. 35 illustrates a partial sectional view of the electrical device 1000 illustrated in FIG. 30. FIG. 36 illustrates a perspective view of a second PCB 1172. FIGS. 37 and 38 illustrate perspective views of the electrical device 1000 with a portion of the housing removed.

Thus, the invention provides, among other things, an electrical device that includes a SR motor. One or more independent features and independent advantages of the invention are set forth in the following claims:

We claim:

1. A power tool comprising:
   a housing including a grip portion engageable by a hand of an operator, the housing being supportable by the operator during operation of the power tool;
   a switched reluctance motor positioned inside the housing and operable to drive a tool element to work on a work piece;
   wherein the switched reluctance motor includes a stator assembly including a stator positioned relative to the housing, the switched reluctance motor further including a rotor assembly including a shaft rotatable relative to the stator about an axis, and a rotor connected to the shaft for rotation with the shaft relative to the stator, the stator assembly supporting at least one end of the rotor assembly for rotation about the axis; and
   electrical components operable to control the operation of the switched reluctance motor, wherein the stator includes a first side and a second side, wherein the stator assembly further includes windings supported on the stator, a terminal plate having terminals electrically connected to the windings and to the electrical components, and a rear bell configured to support the electrical components, the terminal plate being directly connected to the first side of the stator, the rear bell being directly connected to the first side of the stator and spaced from the terminal plate.

2. The power tool as claimed in claim 1 wherein the rear bell supports the at least one end of the rotor assembly for rotation about the axis.

3. The power tool as claimed in claim 1 wherein the electrical components are electrically connected to the terminals via a contact extending through the rear bell.

4. The power tool as claimed in claim 1 wherein the electrical components are removably connected to the terminals, and wherein the rear bell is removably connected to the first side of the stator.

5. The power tool as claimed in claim 1 wherein the power tool is a reciprocating saw.

6. The power tool as claimed in claim 1 wherein the power tool is a circular saw.

7. The power tool as claimed in claim 1 wherein the housing includes a handle, the handle providing the grip portion.

8. The power tool as claimed in claim 1 wherein the housing includes a second grip portion engageable by another hand of the operator.

9. The power tool as claimed in claim 1 wherein the power tool further comprises a magnet hub connected to the shaft for rotation with the shaft relative to the stator.

10. The power tool as claimed in claim 9 wherein the rotor includes a plurality of rotor poles, and wherein the magnet hub includes a plurality of magnet poles, each magnet pole representing at least one of the rotor poles.

11. The power tool as claimed in claim 9 and further comprising a bearing connected to the shaft, the bearing being connected to the shaft axially inward of the magnet hub.

12. The power tool as claimed in claim 11 and further comprising a bearing support, wherein the bearing is received in the bearing support, and wherein the magnet hub is encapsulated between the bearing and the bearing support when the bearing is received in the bearing support.

13. The power tool as claimed in claim 1 wherein the windings being electrically coupled to form three electrically independent phases of the switched reluctance motor.

14. The power tool as claimed in claim 1 wherein the electrical components include low voltage electrical components and power electrical components operable to receive power from a power supply.

15. The power tool as claimed in claim 14 wherein the power electrical components receive an alternating current power from an alternating current power supply.

16. The power tool as claimed in claim 14 wherein the power electrical components receive a direct current power from a rechargeable battery.

17. The power tool as claimed in claim 14 wherein the power electrical components include power transistors, wherein the switched reluctance motor includes a stator and windings supported on the stator, and wherein the power transistors are operable to energize the windings.

18. The power tool as claimed in claim 14 wherein the power electrical components include a storage capacitor operable to store at least a portion of the power received from the power supply.

19. The power tool as claimed in claim 14 wherein the low voltage electrical components include hall effect devices, wherein the switched reluctance motor includes a shaft rotatable about an axis, wherein the power tool further comprises a magnet hub connected to the shaft for rotation with the shaft, and wherein the hall effect devices sense rotation of the magnet hub.

20. The power tool as claimed in claim 14 wherein the low voltage electrical components include speed sensors, wherein the switched reluctance motor includes a shaft rotatable about an axis, and wherein the speed sensors sense a speed of rotation of the shaft.

21. The power tool as claimed in claim 14 wherein the low voltage electrical components include position sensors, wherein the switched reluctance motor includes a stator positioned relative to the housing, a shaft rotatable relative to the stator about an axis, and a rotor connected to the shaft for rotation with the shaft relative to the stator, and wherein the position sensors sense a position of the rotor relative to the stator.

22. The power tool as claimed in claim 1 wherein the electrical components include low voltage electrical components and power components operable to receive power from a power supply, and wherein the first printed circuit board includes the low voltage components and the second printed circuit board includes the power components.

23. The power tool as claimed in claim 22 wherein the first printed circuit board is spaced from the second printed circuit board to reduce electrical interference generated by the power components on the low voltage components.

24. The power tool as claimed in claim 1 and further comprising a heat sink in a heat transfer relationship with at least one of the electrical components.

25. The power tool as claimed in claim 24 wherein the power tool further comprises a fan connected to the shaft for rotation with the shaft, the fan creating a flow of air over the heat sink to dissipate heat generated by the at least one of the electrical components during operation of the power tool.

26. The power tool as claimed in claim 25 wherein the housing includes an inlet through which air enters the housing.

27. The power tool as claimed in claim 25 wherein the housing includes an outlet through which air exits the housing.

28. The power tool as claimed in claim 25 wherein the fan creates a flow of air over at least a portion of the switched reluctance motor to dissipate heat generated by the switched reluctance motor during operation of the power tool.

29. The power tool as claimed in claim 28 wherein the switched reluctance motor includes windings supported on the stator, and wherein the at least a portion of the switched reluctance motor includes the windings.

30. The power tool as claimed in claim 25 wherein the fan includes a mixed flow fan.

* * * * *